US012632884B2

(12) United States Patent
Morgan et al.

(10) Patent No.: US 12,632,884 B2
(45) Date of Patent: May 19, 2026

(54) DYNAMICALLY DETERMINING AND SERVING CONTENT TO END USERS ACROSS DIFFERENT PLATFORMS

(71) Applicant: Target Brands, Inc., Minneapolis, MN (US)

(72) Inventors: Chad Morgan, Portland, OR (US); Anand Khanna, San Jose, CA (US); Fan Zhang, Sewickley, PA (US); Jialin Li, St. Louis Park, MN (US); Kenneth Dombeck, Eden Prairie, MN (US); Princewill Eneh, Eden Prairie, MN (US); Chloe Villarente Favor, San Francisco, CA (US); Jacob Portnoy, Rosemount, MN (US); Christopher Johnson, Plymouth, MN (US); Timothy Pekarna, Minneapolis, MN (US); Janet Keel, Falcon Heights, MN (US)

(73) Assignee: Target Brands, Inc., Minneapolis, MN (US)

( * ) Notice: Subject to any disclaimer, the term of this patent is extended or adjusted under 35 U.S.C. 154(b) by 157 days.

(21) Appl. No.: 18/597,207

(22) Filed: Mar. 6, 2024

(65) Prior Publication Data

US 2025/0285139 A1     Sep. 11, 2025

(51) Int. Cl.
    *G06Q 30/0251*        (2023.01)
(52) U.S. Cl.
    CPC ..... *G06Q 30/0253* (2013.01); *G06Q 30/0269* (2013.01)
(58) Field of Classification Search
    CPC ........................................ G06Q 30/0207–0277
    (Continued)

(56) References Cited

U.S. PATENT DOCUMENTS 8,583,635 B1 * 11/2013 Nanno .................. G06F 16/338
                                                        707/723
8,700,470 B2     4/2014 Chung et al.
            (Continued)

OTHER PUBLICATIONS

Xiaotong Ding, "Using Cosine Similarity to Compare Users in a Recommendation System", retrieved from https://dingxt-claire. medium.com/using-cosine-similarity-to-compare-users-in-a-recommendation-system-615188f17d76, available on Mar. 20, 2021 (Year: 2021).*

*Primary Examiner* — Sam Refai
(74) *Attorney, Agent, or Firm* — Barnes & Thornburg LLP

(57)            ABSTRACT

The disclosed systems and methods provide a system for dynamically serving personalized content for presentation across computing devices of different guests in an online retail environment. A server system can: retrieve, from a data repository, a subset of predefined content stories having a predetermined activation status and guest purchase data for at least a portion of guests in the online retail environment, the guest purchase data indicating products each guest purchased, determine product embeddings for each story in the subset, each embedding indicating a product linked to the story, determine, based on applying a guest story similarity (GSS) model to the guest purchase data for each guest, a similarity score between the guest purchase data and the embeddings that indicates a likelihood the guest would purchase products embedded in the story, and serve a content story having a similarity score that satisfies one or more guest personalization criteria.

20 Claims, 20 Drawing Sheets

(58) Field of Classification Search
USPC ............................................. 705/14.1–14.73
See application file for complete search history.

(56) References Cited

U.S. PATENT DOCUMENTS

| | | | |
|---|---|---|---|
| 9,171,088 B2 | 10/2015 | Thakur et al. | |
| 10,204,316 B2 | 2/2019 | Muller et al. | |
| 10,909,580 B1 | 2/2021 | Krishnamurthy et al. | |
| 2005/0102202 A1 | 5/2005 | Linden et al. | |
| 2007/0150368 A1 | 6/2007 | Arora | |
| 2008/0319918 A1 | 12/2008 | Forlai | |
| 2011/0184928 A1* | 7/2011 | Vadon ................. | G06F 16/9535 |
| | | | 707/706 |
| 2014/0019244 A1* | 1/2014 | Gundapaneni ..... | G06Q 30/0611 |
| | | | 705/14.54 |
| 2015/0213482 A1* | 7/2015 | Zimak ................ | G06Q 30/0244 |
| | | | 705/14.43 |
| 2015/0317714 A1 | 11/2015 | Huet et al. | |
| 2017/0330262 A1 | 11/2017 | Jadhav et al. | |
| 2019/0385208 A1 | 12/2019 | Warren et al. | |
| 2021/0201351 A1 | 7/2021 | Nag et al. | |
| 2023/0306493 A1* | 9/2023 | Downey ............ | G06Q 30/0283 |

\* cited by examiner $$decay\_score_{\{guest,product\}} = \sum exp\left[-\frac{days\ since\ purchase}{halflife/\log(2)}\right]$$

230
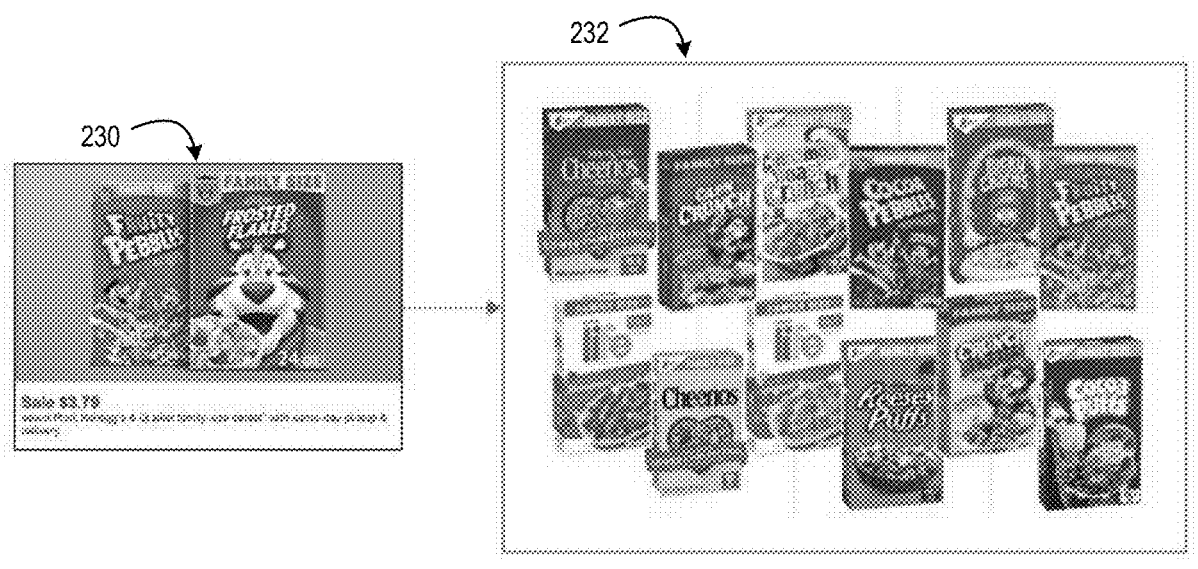
232
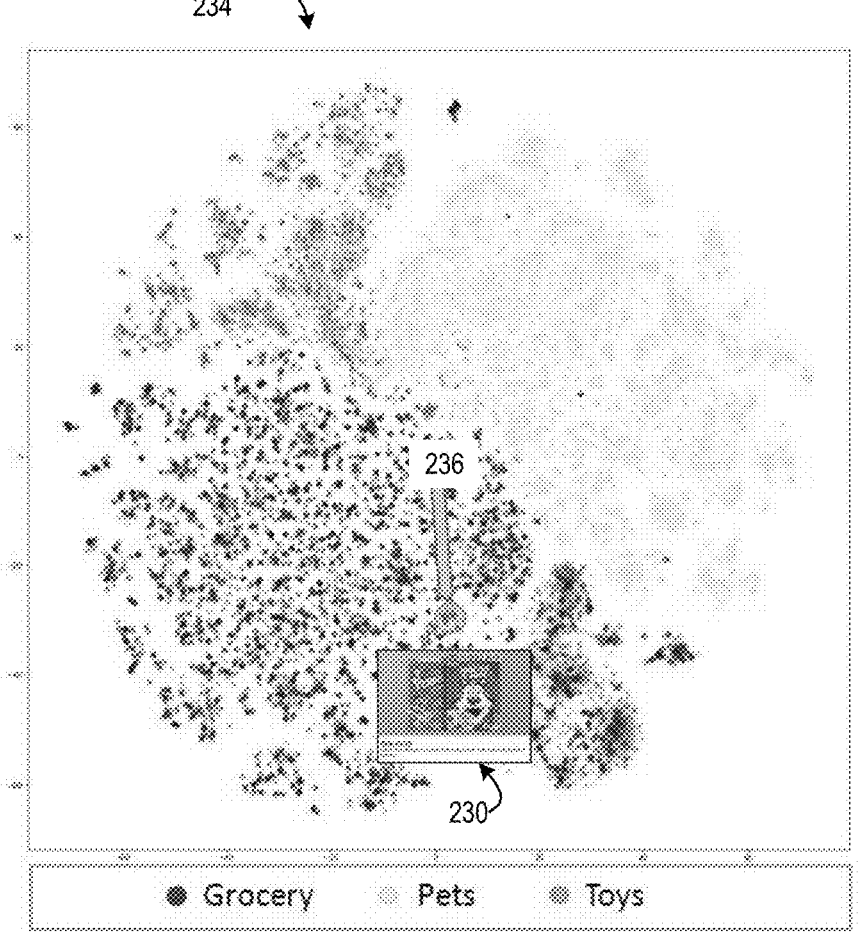
234
236
230
● Grocery    Pets    ● Toys
FIG. 2D

240

$$\text{similarity}_{\{\text{story,tcin}\}} = \cos(\theta) = \frac{S \cdot T}{\|S\| \|T\|}$$

234

$$score_{\{guest,story\}} = \sum_{\substack{\text{all tcins in} \\ \text{guest history}}} similarity_{\{story,tcin\}} \times decay\_score_{\{guest,tcin\}}$$

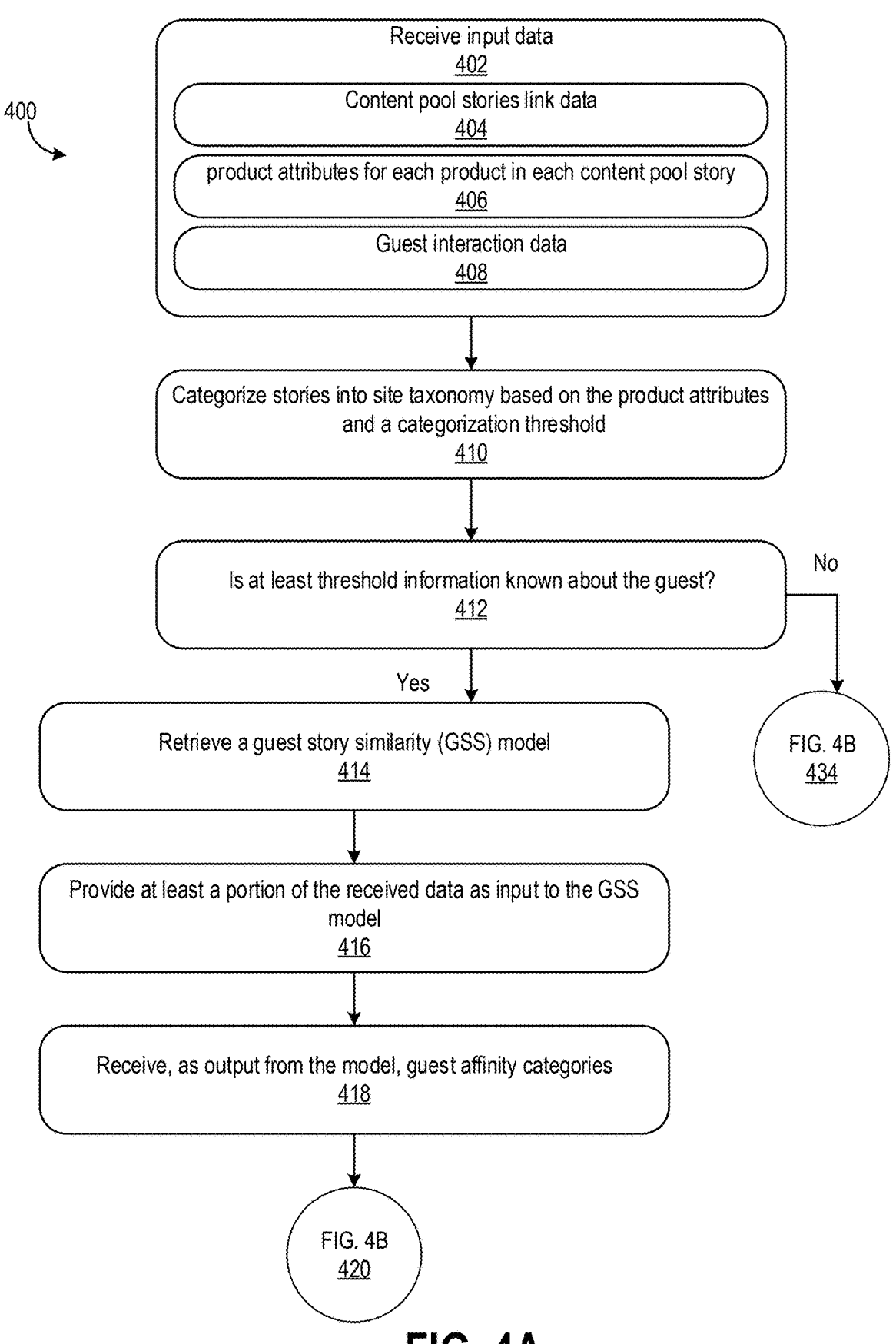

400

Receive input data
402

Content pool stories link data
404 product attributes for each product in each content pool story
406

Guest interaction data
408

Categorize stories into site taxonomy based on the product attributes and a categorization threshold
410

Is at least threshold information known about the guest?
412

No

Yes

Retrieve a guest story similarity (GSS) model
414

FIG. 4B
434

Provide at least a portion of the received data as input to the GSS model
416

Receive, as output from the model, guest affinity categories
418

Provide at least a portion of the received data as input to a seasonality model to identify seasonally relevant stories for the guest
434

Identify at least one newest story in the content pool that satisfies one or more guest filter criteria
436

Return one or more of the identified stories for the guest
438

FIG. 4A
418

Determine, based on the guest affinity categories, similarity scores for stories having products most relevant to the guest
420

Rank the stories based on the similarity scores for the guest
424

Return one or more of the ranked stories that satisfy one or more guest personalization filter criteria
426

FIG. 4B

500

Receive input data
502

Output from guest story similarity (GSS) model
504

Historic guest purchase and browsing data
506

↓

Retrieve a click-through model
508

↓

Provide at least a portion of the received data as input to the model
510

↓

Receive as output from the model a prediction of products of interest to the guest based on analysis of guest engagement in the received data
512

Generate an intent mapping for the guest based on the prediction of products of interest to the guest
514

↓

Determine, based on the prediction of the products of interest and/or the intent mapping, at least one story linking to a product of most interest to the guest
516

↓

Return the at least one story
518

FIG. 5A

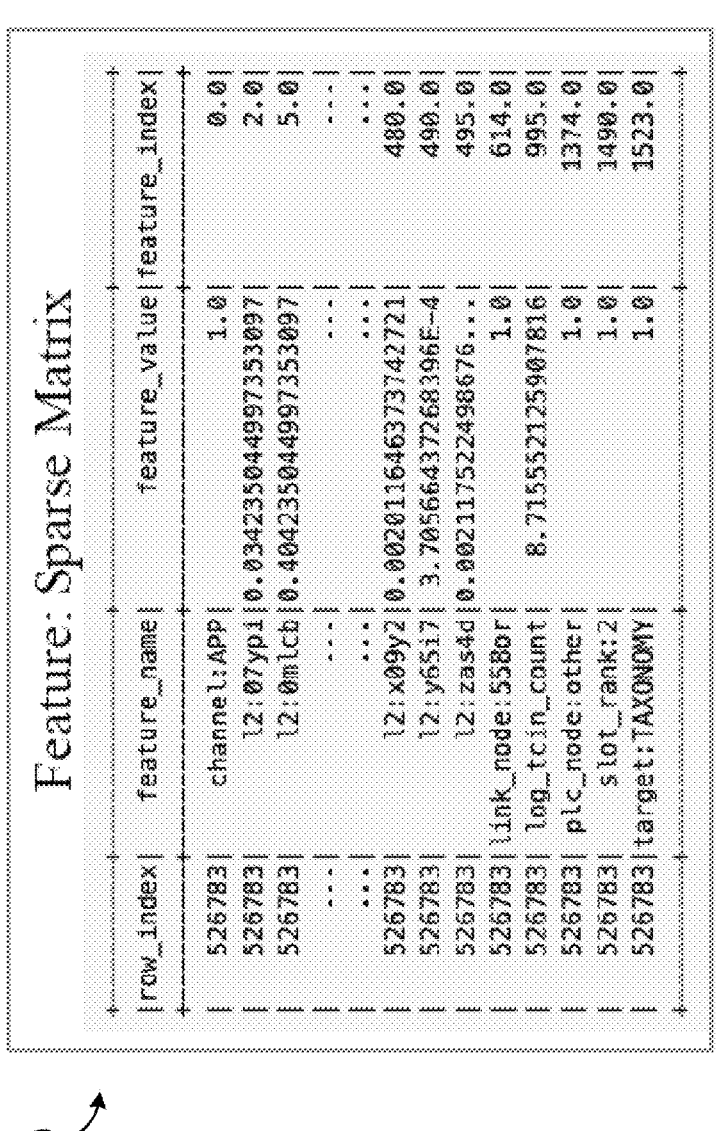

Feature: Sparse Matrix

| row_index | feature_name | feature_value | feature_index |
|---|---|---|---|
| 526783 | channel:APP | 1.0 | 0.0 |
| 526783 | l2:07yp1 | 0.0342350449973530497 | 2.0 |
| 526783 | l2:0mlcb | 0.4042350449973530497 | 5.0 |
| ... | ... | ... | ... |
| ... | ... | ... | ... |
| 526783 | l2:x09y2 | 0.002011646373742721 | 480.0 |
| 526783 | l2:y65i7 | 3.70566437268396E-4 | 490.0 |
| 526783 | l2:zas4d | 0.002117522498676... | 495.0 |
| 526783 | link_node:55Bor | 1.0 | 614.0 |
| 526783 | log_tcin_count | 8.71555212590781G | 995.0 |
| 526783 | plc_node:other | 1.0 | 1374.0 |
| 526783 | slot_rank:2 | 1.0 | 1490.0 |
| 526783 | target:TAXONOMY | 1.0 | 1523.0 |

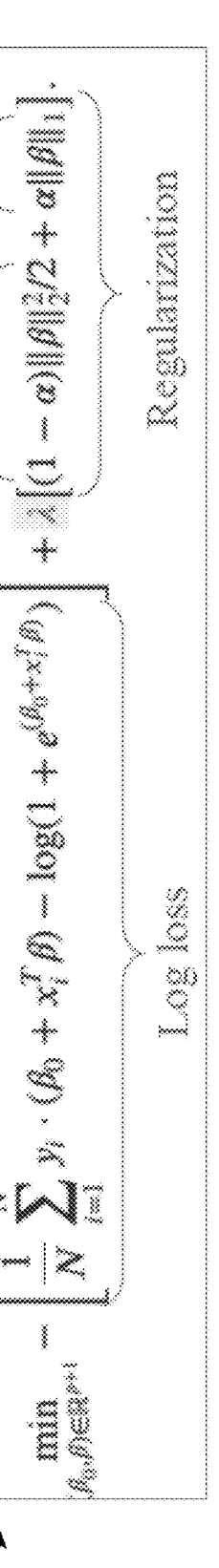

$$\min_{\beta_0, \beta \in \mathbb{R}^{p+1}} -\left[\frac{1}{N}\sum_{i=1}^{N} y_i \cdot (\beta_0 + x_i^T\beta) - \log(1 + e^{(\beta_0 + x_i^T\beta)})\right] + \lambda\left[(1-\alpha)\|\beta\|_2^2/2 + \alpha\|\beta\|_1\right].$$

Log loss          Regularization

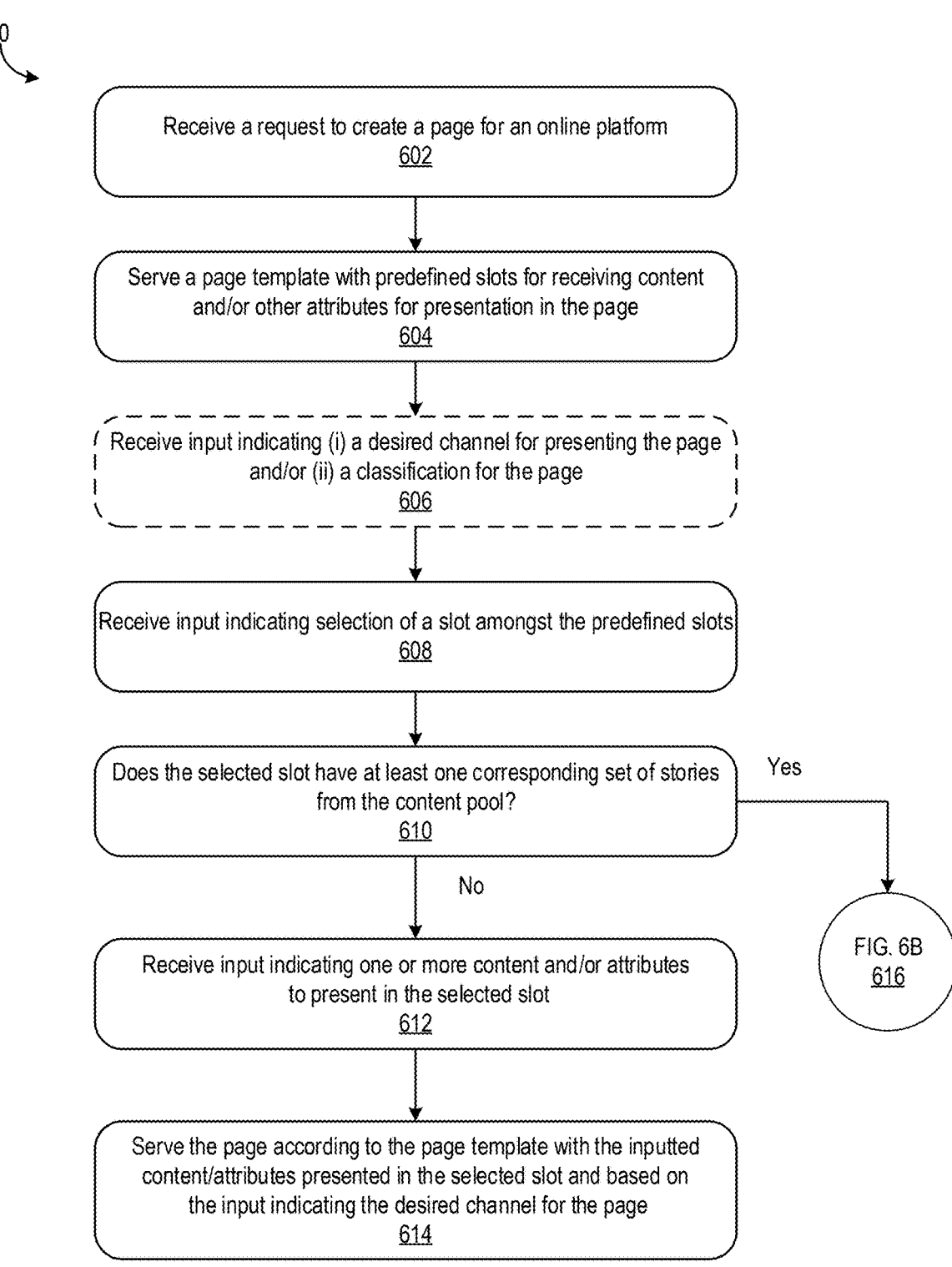

Receive a request to create a page for an online platform
602

Serve a page template with predefined slots for receiving content
and/or other attributes for presentation in the page
604

Receive input indicating (i) a desired channel for presenting the page
and/or (ii) a classification for the page
606

Receive input indicating selection of a slot amongst the predefined slots
608

Does the selected slot have at least one corresponding set of stories
from the content pool?
610

Yes

Receive input indicating one or more content and/or attributes
to present in the selected slot
612

Serve the page according to the page template with the inputted
content/attributes presented in the selected slot and based on
the input indicating the desired channel for the page
614

FIG. 6A

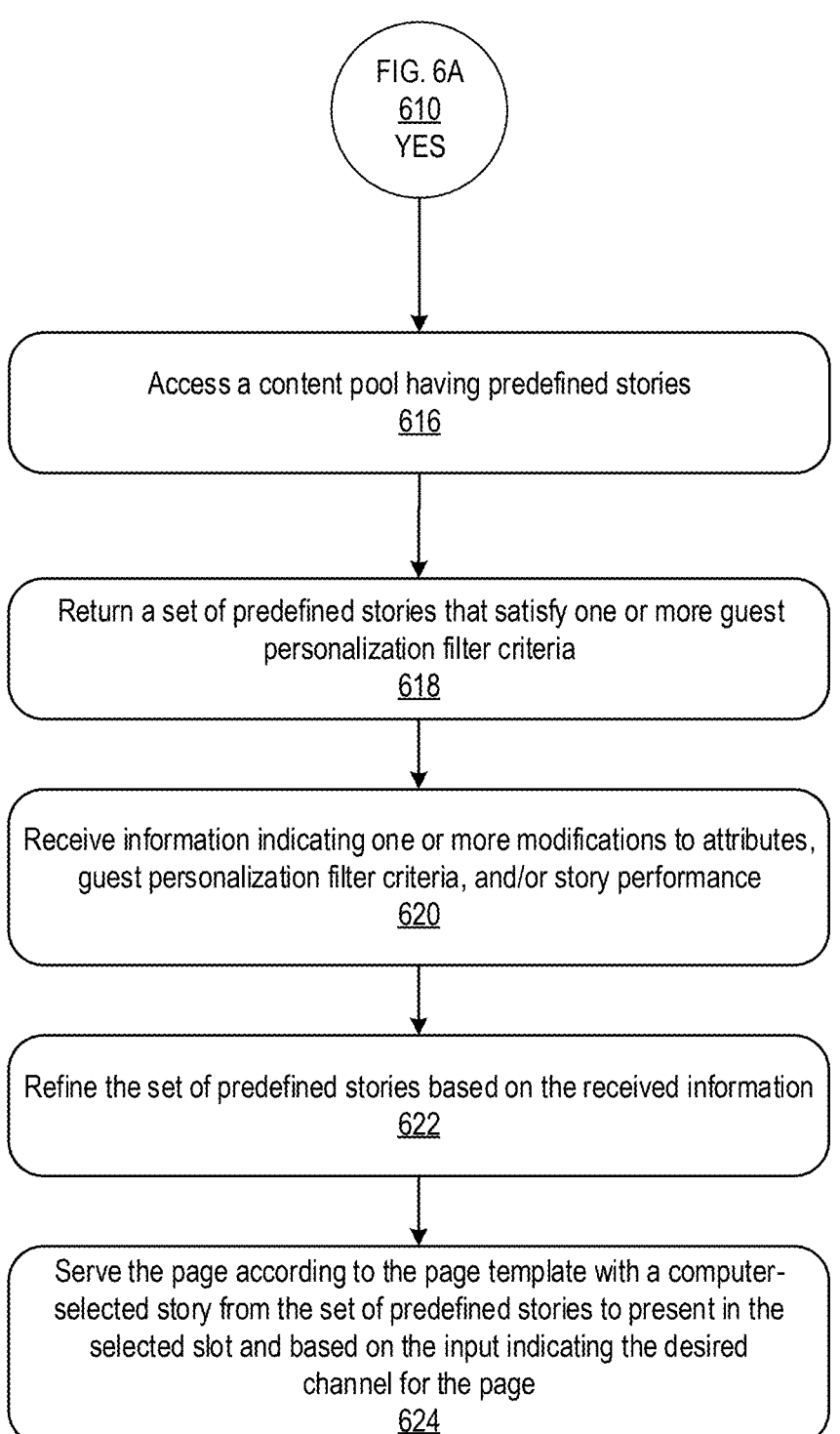

FIG. 6A
610
YES

Access a content pool having predefined stories
616

Return a set of predefined stories that satisfy one or more guest personalization filter criteria
618

Receive information indicating one or more modifications to attributes, guest personalization filter criteria, and/or story performance
620

Refine the set of predefined stories based on the received information
622

Serve the page according to the page template with a computer-selected story from the set of predefined stories to present in the selected slot and based on the input indicating the desired channel for the page
624

DYNAMICALLY DETERMINING AND SERVING CONTENT TO END USERS ACROSS DIFFERENT PLATFORMS

TECHNICAL FIELD

This document generally describes devices, systems, platforms, and methods related to dynamically determining and presenting content across multiple different platforms, such as desktop websites, mobile websites, and mobile applications, to different users, which can be in the context of an online retail environment.

BACKGROUND

Online platforms, including but not limited to online retail environments, blogs, stores, social media platforms, etc., can be developed for presentation in different types of channels, such as mobile applications, mobile websites, and/or desktop websites. Sometimes, content in an online retail environment can be adapted based on a designated channel for presentation. For every desired channel for presentation, users may modify the content so that the content can be appropriately presented based on requirements of that channel.

Content can be specifically curated and associated with a particular page in an online platform, such as an online retail environment and presented to various end users having same, similar, and/or different interests. For example, sales, deals, or other promotional images/text/information can be generated for and associated with a page directed to women's clothing while different sales, deals, or other promotional information can be generated for and associated with a page directed to children's clothing. Such content can be presented at devices of the various end users, regardless of whether some of the end users express interest in women's clothing, children's clothing, or other similar content that may be curated and presented in the online retail environment.

SUMMARY

The document generally describes systems, methods, platforms, and techniques for dynamically identifying and serving stories based on their underlying content, which itself may be dynamically associated with stories, and based on inferred interests of end users, such as guests, in online, mobile app, and mobile web interfaces for an online platform (e.g., online retail environment, social platform, social media). Content can be organized in terms of stories that can present various products, deals, offers, or other information to guests in an online retail environment. The stories can be presented in a variety of shapes, looks, and/or formats. The stories can be multi-platform (e.g., presentable in web and/or application interfaces) and can be multi-purpose (e.g., to feature one or more products and/or product categories, to provide deals, offers, corporate commitments, and/or delivery/shipping options). For example, a story can include various parameters that are used to dynamically select content to present with or upon selection of the story. The disclosed technology can additionally infer user interest in content elements based on a variety of factors, as described throughout this document, and can use the combination of content elements dynamically linked to stories and inferred user interests to rank and select particular stories for presentations to users across multiple different platforms.

For instance, the disclosed technology can be used for identifying content presented in stories to serve to end users in the online retail environment from among multiple different candidate content stories. The candidate stories can each be dynamically associated with one or more different products in the online retail environment. Accordingly, the disclosed technology can provide a loose and dynamic association between stories and products, and between the placement and selection of stories to present within and across multiple different platforms, including web browser, mobile app, and mobile web applications. Content stories can include inputs such as images, text, and/or a link (or multiple links), as well as parameters that are associated with the stories and how they are served. Content stories may directly or indirectly link to products, such as a story being directed to a particular type, style, or brand of clothing item. The underlying products associated with stories can change over time, though, based on the products that are associated with and that satisfy metadata criteria for the stories.

The disclosed technology provides relevant story selection and presentation to users by mapping stories to products that, at that particular point in time, are returned for the story. Traditionally, content on different platforms, pages, and/or page slots can be set up separately, which may cause out of alignment information, difficulty to track guest interactions, same content appearing different in metadata (e.g., highly duplicated), and/or higher workload for creative teams. The disclosed technology, on the other hand, provides a content pool with a standardized front end presentation configuration for content stories that allows uniform formatting of story data and easier tracking of guest interactions to personalize what content is presented to which guests. The disclosed technology can compare those products against a product mapping of relevant guest products in n-dimensional space. The disclosed technology provides for comparison of products that are retrieved for a particular story against products that are of interest to a guest within n-dimensional space that numerically represents product similarity by using a product taxonomy. Stories that are closer to an n-dimensional positioning of guest interest can be selected for presentation to the particular guest(s). The n-dimensional space can provide a spatial mapping of different products and features across a product taxonomy, so that similar or related products to previously purchased products can be represented by smaller distances. Sometimes, click information can be modeled and used to determine what products are most similar to interests of the particular guest to then select an appropriate story for presentation to the guest. Sometimes, when a sufficient amount of guest behavior or other information is unknown about the guest (e.g., the guest has not previously shopped in the online retail environment), seasonality and/or story newness modeling can be used to determine what content story or stories to present to the guest. As the guest behavior becomes known over time (e.g., the guest makes a purchase in the online retail environment, the guest browses and clicks through the online retail environment), the disclosed technology can leverage product mapping and/or other modeling techniques described herein to personalize (e.g., identify, determine, select) what content story or stories to present to the particular guest.

One or more embodiments described herein can include a system for dynamically serving personalized content for presentation across computing devices of different guests in an online retail environment, the system including: a data repository that can be configured to store (i) a group of predefined content stories in a content pool and (ii) guest behavior data of a group of guests in an online retail environment, the predefined content stories including visual content elements that can be configured to be maintained in a single instance and visually presented according to different presentation requirements of different channels, and a server system in data communication with the data repository. The server system can be configured to: retrieve, at a first time and from the data repository, (i) a subset of the predefined content stories having a predetermined activation status and (ii) the guest purchase data for at least a portion of the group of guests in the online retail environment, the guest purchase data indicating one or more products that each guest of the portion of guests has purchased, determine, at the first time, product embeddings for each story in the subset of the predefined content stories, each of the product embeddings indicating a product that is linked to the story, determine, at the first time and based on applying a guest story similarity (GSS) model to the guest purchase data for each of the portion of guests, a similarity score between the guest purchase data and the determined product embeddings, the similarity score indicating a likelihood that the guest would purchase one or more products that are embedded in the story, rank, at the first time and for each of the portion of guests, the subset of the predefined content stories from highest to lowest similarity score, receive, at a second time, a request for content in the online retail environment from a computing device of a guest amongst the portion of guests, select, at the second time and in response to receiving the request, a story amongst the ranked content stories having a similarity score that satisfies one or more guest personalization criteria, and serve, at the second time, the selected story to the computing device of the guest.

In some implementations, the embodiments described herein can optionally include one or more of the following features. For example, the second time can be after the first time. The first time can occur at predetermined time intervals and the second time can be runtime. Determining, at the first time, product embeddings for each story in the subset of the predefined content stories may include identifying the products that are linked to the story. Sometimes, determining, at the first time, product embeddings for each story in the subset of the predefined content stories may include augmenting data associated with the story to derive one or more story attributes, the story attributes including at least one of a category, a story brand map, a story facet map, and a story offer map. Determining the product embeddings for each story in the subset can also be based on mapping the derived story attributes into n-dimensional space.

Sometimes, determining, at the first time and based on applying a guest story similarity (GSS) model to the guest purchase data for each of the portion of guests, a similarity score between the guest purchase data and the determined product embeddings may include: calculating an exponential decay of the guest purchase data, and determining a decayed guest product score based on the exponential decay. The decayed guest product score can be based on frequency and recency that the guest purchased the one or more products in the online retail environment over a predetermined period of time. The predetermined period of time can be a past 6 months. Determining the similarity score may also include: calculating, for each story in the subset of the predefined content stories, a cosine similarity between the product embeddings and the guest purchase data, and determining a story product similarity score. Determining the similarity score can also include mapping the product embeddings and the one or more products in the guest purchase data into n-dimensional space. Determining the similarity score may also include determining a distance between each of the product embeddings and each of the one or more products in the guest purchase data, and identifying a product associated with one of the product embeddings that has a smallest distance to at least one of the products in the guest purchase data in the n-dimensional space mapping. Sometimes, determining the similarity score can include determining a summation of the decayed guest product score multiplied by the story product similarity score, and returning the summation as the similarity score between the guest purchase data and the determined product embeddings.

As another example, selecting the story amongst the ranked content stories may include selected a highest ranked story amongst the ranked content stories. Selecting the story amongst the ranked content stories can include filtering the ranked content stories based on information included in the request from the computing device of the guest, the information indicating at least one of: (i) a type of content requested for presentation in a graphical user interface (GUI) display at the computing device of the guest and (ii) a channel for presentation of the selected story. The type of content may include at least one of a deal, an offer, and a category of products available for purchase in the online retail environment. The channel for presentation of the selected story may include at least one of a web-based application, a mobile application, a desktop webpage, and a mobile webpage. The server system can also be configured to, based on the channel for presentation of the selected story, dynamically adjust the presentation of the singular instance of the content elements of the selected story based on presentation requirements of the channel, the singular instance of the content elements being commonly used across all channels.

In some implementations, the server system can also to: determine whether at least threshold information is known about the guest in the portion of guests, and based on determining that at least the threshold information is known, applying the GSS model to determine the similarity score for the guest. The server system may also: in response to determining that at least the threshold information is unknown about the guest, apply at least one of seasonality model and a newest story model to the subset of the predefined content stories to determine a story to serve to the guest. The server system can be configured to apply the seasonality model and then apply the newest story model. The server system can apply the seasonality model or the newest story model. The seasonality model can be configured to: predict aggregated seasonal forecasted sales over a predetermined period of time for each of the subset of the predefined content stories, and rank the subset of the predefined content stories by their predicted sales from highest to lowest predicted sales. The predetermined period of time can be an upcoming 7 days. The server system can also be configured to select a top ranked story amongst the subset of the predefined content stories that are ranked by the predicted sales, and serve the selected story to the computing device of the guest.

Sometimes, the newest story model can be configured to rank the subset of the predefined content stories based on respective activation date, from latest to earliest activation date, the respective activation date being identified in metadata associated with each story in the subset of the predefined content stories. The server system can also select a top ranked story amongst the subset of the predefined content stories that are ranked from latest to earliest activation date and serve the selected story to the computing device of the guest. The server system can be configured to: identify a set of top-ranked stories amongst the subset, and randomly select one story in the set to serve to the computing device of the guest.

The server system can also be configured to: retrieve a click-through model, provide output from the GSS model and the guest purchase data for each guest in the portion of guests as input to the click-through model, receive, as output from the click-through model, a prediction of products of interest to the guest based on assessment of guest engagement with products in the online retail environment identified in the input data, identify, based on the prediction, at least one story of the subset of predefined content stories that links to a product of most interest to the guest, and serve the at least one story to the computing device of the guest. Sometimes, the click-through model can be trained to generate an intent mapping for the guest based on the prediction, the intent mapping indicating numerical correlations between the guest engagement in the online retail environment and products available for purchase in the online retail environment.

The devices, system, and techniques described herein may provide one or more of the following advantages. For example, the disclosed technology can provide efficient, automatic, and timely algorithmic techniques for selecting what content to present to different guests (e.g., end users) in a retail environment. Similarly, the disclosed technology can provide an efficient cadence for making such types of decisions. The algorithmic techniques can identify granular mappings and correlations between what products are represented in content stories and individual guest purchase and interaction habits with the retail environment. As a result, the disclosed technology may provide for improved effectiveness in identifying curated content for particular guests and/or guest affinities.

Similarly, automatically selecting content to display to different guests using AI techniques can result in increased time savings for relevant users associated with the retail environment (e.g., content creators). As a result, the relevant users may not be required to manually select content and manually configure each page for different guests. The users may instead divert their time and resources to generating content while the automated computer techniques described herein accurately and quickly identifies content to present to the different users and configures the pages for the guests with the identified content.

The disclosed technology may also provide rich marketing content to guests that helps guests make purchases and have improved experiences with the retail environment. The disclosed technology can surface marketing material itself as a recommendation and personalize that in a way that may appear visually seamless to guests. Rather than showing the guest particular product data, the disclosed technology can recommend a piece of content to the guest, which provides more of a discovery rather than merely telling the guest what to purchase. This improves the guest experience with the retail environment and may promote the guest's purchase of various products available in the retail environment.

The disclosed technology can provide for separating content from pages in an online platform, such as an online retail environment, and dynamically generating, serving, and presenting the same content elements in multiple different channels (e.g., webpage, application, or other type of page). The content can be maintained in a pool (e.g., the content can be stories maintained in a content pool) that allow for reusability and efficient serving of the content dynamically across (i) different channels for presentation and (ii) different structures, engines, and/or teams in an enterprise. The content may not need to be re-generated to comply with presentation/formatting standards of the different platforms, which can reduce a quantity of compute resources and processing power that may be used in generating and updating the content as well as generating pages in the online retail environment. Because less compute resources and processing power may be used, the content can be readily, quickly, and efficiently served when requested for presentation in the different platforms. Content creation and/or page development times can also be reduced.

Similarly, the pool of content can permit for decoupling of content and pages/interfaces so that the two are not expressly linked to each other, which can permit for greater flexibility and efficiency in generating content, developing pages and interfaces in which the content will be presented, and selecting content to present to a particular user based on their guest behavior. The disclosed technology can additionally permit for consistency across multiple different channels without having to specifically encode, place, or adapt the content for each of the different channels. Instead, the content can be created once and then maintained in a dynamically adaptive content pool to be served across any channel, without requiring the content to be generated multiple times to comply with formats/presentation requirements of any one channel.

As another example, articulating content of a story in its separate parts (e.g., copy, images, etc.) can allow for creation of robust metadata about the story (e.g., classification, categorization). This allows for efficiently rendering content across multiple channels, providing consistency in formatting on pages built using this story, and selecting content to present to particular guests in the online retail environment. Consistently and automatically generating metadata about the content can allow for improved site analytics and improvement. Specifically, this data can enable analysis about which content is effective (especially for particular guests) and by assessing commonalities between pieces of content that are over/under performing in different contexts. Consistent metadata for every piece of content can also enable personalization in presenting content that shares common features with content that end users may have interacted with or converted against in the past, and/or content that shares features with items that the end users have interacted with in the past. Similarly, the disclosed techniques allow a unique ability to flexibly reuse the content in different contexts across pages in a site (e.g., cross-channel, cross-placement, and cross-presentation placement in the pages) to achieve a best return on creative investments. The disclosed techniques also may allow a unique ability to flexibly adapt, manipulate, and/or revise the content on the fly, as it is being used in the different contexts across the pages in the site.

In another example, the disclosed technology can permit for greater efficiency for a content serving system by storing a single instance of each content element instead of multiple distinct instances of each content element adapted for different channels. Such efficiency can use fewer computational resources, including fewer bytes in a content database to store the content elements, and can additionally use fewer computational resources (e.g., processor cycles, memory) for selecting and serving content (e.g., searching across smaller database of content elements for serving).

As another example, the disclosed technology can provide easy to understand analytics about performance of products, stories, pages, etc. for the online retail environment. The disclosed technology may also utilize intuitive parameters to enable quick tuning and/or adjustments to the guest story similarity model, algorithm, and/or rules used to generate personalized story recommendations. As a result, the disclosed technology can accurately determine and provide stories to different guests based on their different behaviors and/or shopping experiences in the online retail environment over time.

The details of one or more implementations are set forth in the accompanying drawings and the description below. Other features and advantages will be apparent from the description and drawings, and from the claims.

BRIEF DESCRIPTION OF THE DRAWINGS

FIG. 2D illustrates techniques for determining story embedding, which can be used to determine the guest story similarity score of FIG. 2B.

FIGS. 4A and 4B are a flowchart of a process for determining a story to present for a particular guest across different platforms.

FIG. 5A is a flowchart of a process for determining a story to present for a particular guest using click-through modeling techniques.

FIG. 5B illustrates techniques for determining a story to present for a group of guests using the click-through modeling techniques of FIG. 5A.

FIGS. 6A and 6B are a flowchart of a process for generating a page from a page template using predefined stories in that are selected for a particular guest using the disclosed techniques.

Like reference symbols in the various drawings indicate like elements.

DETAILED DESCRIPTION OF ILLUSTRATIVE EMBODIMENTS

This document generally relates to systems, methods, platforms, techniques, and technology to generate content stories and select stories for presentation to different guests in an online retail environment, based on those guests purchase activity and/or interactions/behavior with products in the online retail environment. The disclosed technology can implement a guest story similarity model that is trained using machine learning techniques and configured to determine similarities in n-dimensional space between products the guest engages with and other products available in the online retail environment. The model can provide a collaborative filtering approach and can provide story selection/presentation recommendations based on guest purchase history and/or product embedding in the content stories in a content pool. Sometimes, when guest behavior is unknown about a particular guest, the disclosed technology can implement a seasonality model and/or a story newness model to determine what content story or stories to present and/or recommend for presentation to the guest. In some implementations, in addition to or instead of using the guest story similarity model, the disclosed technology can implement a click-through model, which can leverage click data as a response variable for guests in the online retail environment. The model can be a predictive model configured to determine how the guest's interactions with features in the online retail environment may translate to what stories and content more generally the guest would like to see.

Figure 1A:
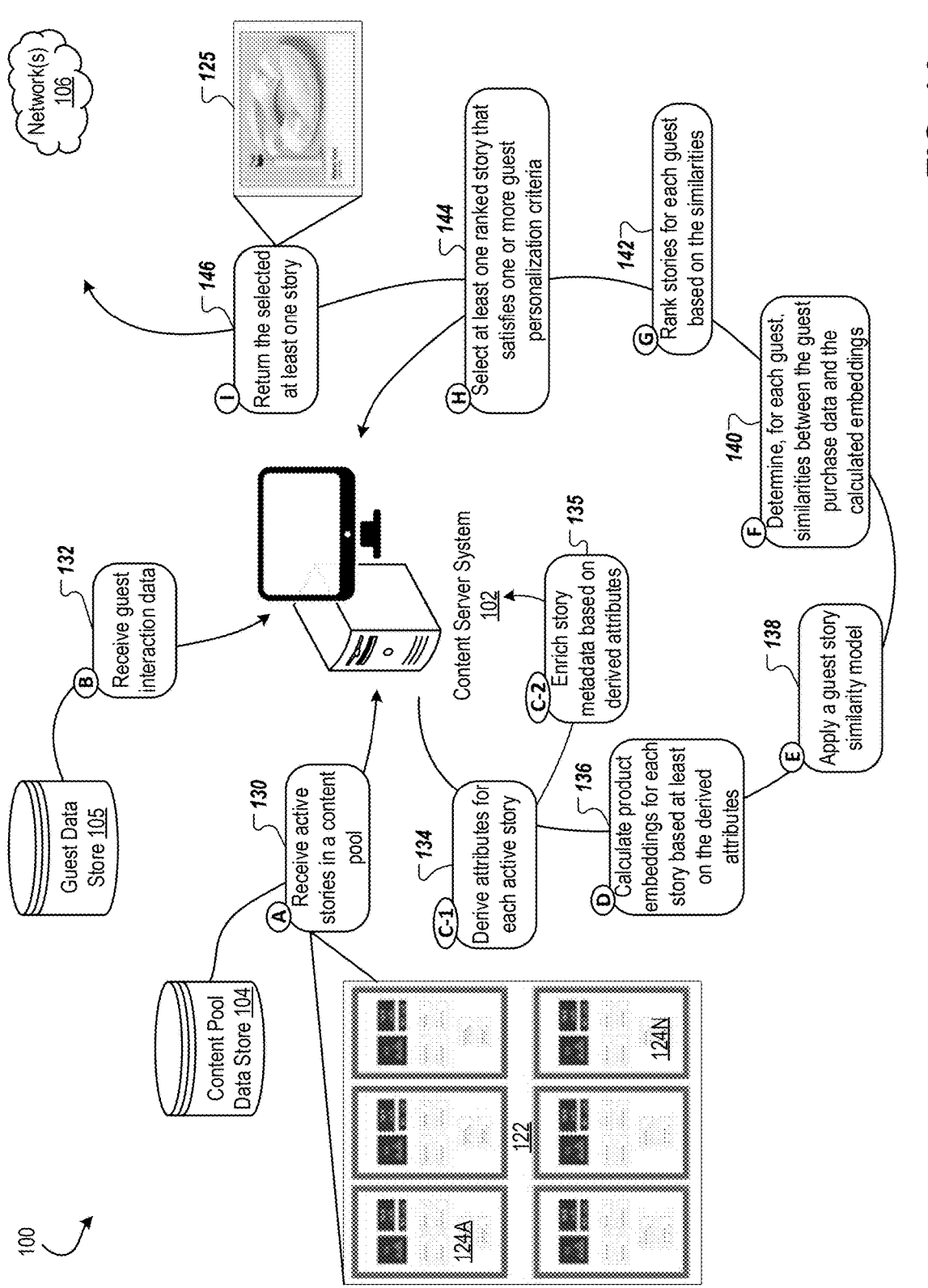
FIG. 1A is a conceptual diagram of a system for identifying a story in a content pool to present to a guest in an online retail environment using guest story similarity modeling techniques.

Referring to the figures, FIG. 1A is a conceptual diagram of a system 100 for identifying a story in a content pool to present to a guest in an online retail environment using guest story similarity modeling techniques. The system 100 can include a content server system 102, a content pool data store 104, and a guest data store 105 in communication (e.g., wired, wireless) via network(s) 106. Refer to at least FIG. 1B for further description about the content server system 102 and the content pool data store 104. The guest data store 105 can be any type of data storage system described herein, that may be configured to maintain information about shoppers and other guests of a retail environment. The retail environment can be an online retail environment. Additionally or alternatively, the retail environment can be a physical store or similar retail environment.

The content server system 102 can receive input data, such as active content stories 124A-N in a content pool 122 (block A, 130) and guest interaction data (block B, 132). The guest interaction data can include guest purchase data. The guest interaction data can include guest click-through data. The guest interaction data can include any other type of historic data that may be associated with the guests interactions with the online retail environment or other associated retail environment. Refer to at least FIG. 1B for further discussion about the content stories 124A-N and the content pool 122.

The content server system 102 may then categorize the stories 124A-N into a site taxonomy for an online retail environment using product attributes and a categorization threshold. The product attributes for each active story 124A-N can be derived by identifying products that are linked to the story (block C-1, 134). The categorization threshold may indicate how many products from a particular category ought to be linked to a story in order to apply the categorization of those products to the story itself. For example, if 30%+ of products in a story correspond to a particular category, then the story is also associated with that category. The categorization threshold may vary based on factors including but not limited to page context and best fit. For example, for some stories, a categorization for that story is made depending on whether 100%, 60%, 5%, etc. of the products in the story relate to a particular category. In some stories (e.g., "Find" stories), it may be unlikely to have 30% of any category of products that is also the richest content for the story. Therefore, the content server system 102 may leverage different category thresholds to ensure that the story can be categorized.

The content server system 102 can also enrich metadata for each of the active stories 124A-N based on their derived attributes (block C-2, 135). For example, the system 102 can label or tag each of the active stories 124A-N with their corresponding derived attributes. Suh labels and/or tags can be used by relevant users to identify and determine which items and/or categories of items to show or otherwise link with each of the active stories 124A-N.

The content server system 102 may calculate product embeddings for each story based on at least the derived attributes (block D, 136). The embeddings can include placements and/or links through the story 124A-N for products. In other words, an embedding can link a particular product to a story so that when the story is placed on a page in the online retail environment, a guest can click on or select the story, which causes another page to be loaded that includes the product from the story.

The content server system 102 can apply a guest story similarity (GSS) model to at least the guest purchase data in block E (138). Refer to FIGS. 2A, 2B, 2C, 2D, 2E, 2F, 4A, and 4B for further discussion about the GSS model.

Using the GSS model, the content server system 102 can determine, for each guest, similarities between the guest purchase data and the calculated embeddings (block F, 140). As described further herein, the content server system 102 can use guest specific information to create an n-dimensional space mapping of products that the guest has purchased. The content server system 102 can then assess each of the stories 124A-N to see whether and how the story's respective product embeddings map into the guest map. In other words, the content server system 102 may use mathematical mapping algorithms to map each of the stories 124A-N to products that qualify at that point of time for the online retail environment (e.g., qualification may change over time based on seasonality, etc.), then identify product mappings for stories that are most similar to guest purchase behavior as mapped in n-dimensional space.

The content server system 102 may identify similar products to the guest's purchases over a predetermined period of time (e.g., a past 6 months). The guest may also express interest in products through purchases, clicks, views, idle time on a particular page having a product, etc. Any of these expressions of interest can be analyze and assessed by the content server system 102 to (i) identify the products of interest to the guest, (ii) map the products into n-dimensional space, and (iii) use the embeddings for the stories 124A-N to map the stories 124A-N having similar products to the guest's products of interest into the n-dimensional space.

As part of determining the guest product similarities in block F (140), the content server system 102 may generate a similarity score between a story and one or more products in the n-dimensional space. The content server system 102 may generate the similarity score for every product that the guest expresses interest in and a particular product (or a particular story having the product) that is also represented in the n-dimensional space. The higher the similarity, the more likely the story having the particular product is to be chosen for and presented to the guest when they visit the online retail environment. The similarity score can be determined as a distance between the product of interest to the guest and the particular product in the n-dimensional space.

The content server system 102 can rank the stories 124A-N for each guest based on their similarities to the guest's purchase history and/or interests (block G, 142). For example, the ranking can be determined based on the similarity scores described above. A highest scoring story can be ranked higher than a lower scoring story. In other words, a story having a product that is more similar to the guest's purchase history and/or interests may be ranked higher than a story having a less similar product(s).

In block H (144), the content server system 102 can select at least one of the ranked stories 124A-N that satisfies one or more guest personalization criteria. The system 102 can select the highest ranked story. The system 102 may select one or more of the highest ranked stories.

The content server system 102 can return the selected at least one story 125 (block I, 146). The at least one story 125 can be transmitted directly to the guest's computing device for presentation in a graphical user interface (GUI) display. For guest's computing device can receive, for example, instructions from the content server system 102 that, when executed, cause the guest's computing device to present the story 125 in a particular placement or slot in a page of the online retail environment that is outputted/presented at the computing device.

Returning the at least one story 125 may additionally or alternatively include transmitting the story 125 to a computing device of a content creator or other relevant user of the online retail environment. The content creator may view several stories selected for the particular guest and then make a determination about whether and/or which of the stories to present to the particular guest.

In some implementations, the content server system 102 may be unable to perform block F (140) for a particular guest or apply the GSS model in block E (138). The guest may be unknown (e.g., first time visiting the online retail environment, never or rarely visited the online retail environment in the past or over a predetermined period of time), may not have made purchases in the past in the retail environment, and/or may not have affinities to any product categories in the retail environment. Accordingly, instead of applying the GSS model, the content server system 102 may apply a seasonality model and/or a newest stories model to the guest purchase data. The seasonality model can be applied first, and if no story may be identified for presentation to the guest, then the newest stories model can be applied. In some implementations, only one of the seasonality and newest stories model may be applied. In yet some implementations, the seasonality and newest stories models can be applied at a same or similar time. Refer to FIGS. 4A and 4B for further discussion about the seasonality and the newest stories models.

In some implementations, the content servers system 102 may implement a story randomizer, which can be configured to compare results from the GSS model story selection, the seasonality model story selection, and/or the newest stories model story selection to further identify categorization thresholds in numerous contexts. The selected stories can then be ranked and recommended for guests that have affinities with associated product categories. The content server system 102 may perform one or more classification and/or placement filtering techniques to further hone in on the ranked stories and identify the at least one story 125 to return for the particular guest.

The blocks A-I (130-146) can be performed at predetermined time intervals and/or at different times (e.g., rather than all in a singular process). For example, some of the blocks A-I (130-146) can be performed on a nightly basis since such blocks may be computationally intensive and/or expensive. Blocks A-G (130-142) may, as an illustrative example, be pre-processed and thus performed every night or during some other predetermined time intervals. On a nightly basis or other predetermined time interval, active pool stories can be identified, similarities can be determined between products in those stories and the guest purchase data, and those stories can be ranked for each guest based on the similarities. Ranking of the similar stories across all the guests can be performed during a period of time when substantial amounts of processing power and other compute resources are available (e.g., overnight) such that the ranked stories (or a selected story 125) can be served quickly to the relevant users (e.g., the guest, content creator). In real-time, or otherwise during runtime, the content server system 102 can then perform blocks H-I (144-146), which includes selecting and returning the at least one story 125 from the ranked stories. Accordingly, blocks A-G (130-142) can be performed at different times from blocks H-I (144-146).

Sometimes, the blocks A-I (130-146) may not be performed sequentially and/or continuously. For example, blocks A-G (130-142) can be performed at a cadence, such as every night. Blocks H-I may only be performed in response to receiving, by the content server system 102 and from a guest computing device, a request for a page in the online retail environment.

Moreover, changes to data and information can be made in real-time, which may impact when the described blocks A-I (130-146) are performed. For example, stories can be updated, changed, deleted, no longer active, active, etc. Product identifiers linked to a story may be changed. Stories can be categorized differently. Sometimes, one or more of the disclosed blocks A-I (130-146) may be performed in flight, in real-time, to accurately respond to such data and/or information changes. As an illustrative example, one or more of the blocks A-I (130-146) may be performed every 10 minutes, and/or any other predetermined time intervals to account for frequent changes in categorization and/or eligibility of stories. Batch processing may also be performed more frequently (e.g., blocks A-G (130-142)).

Figure 1B:
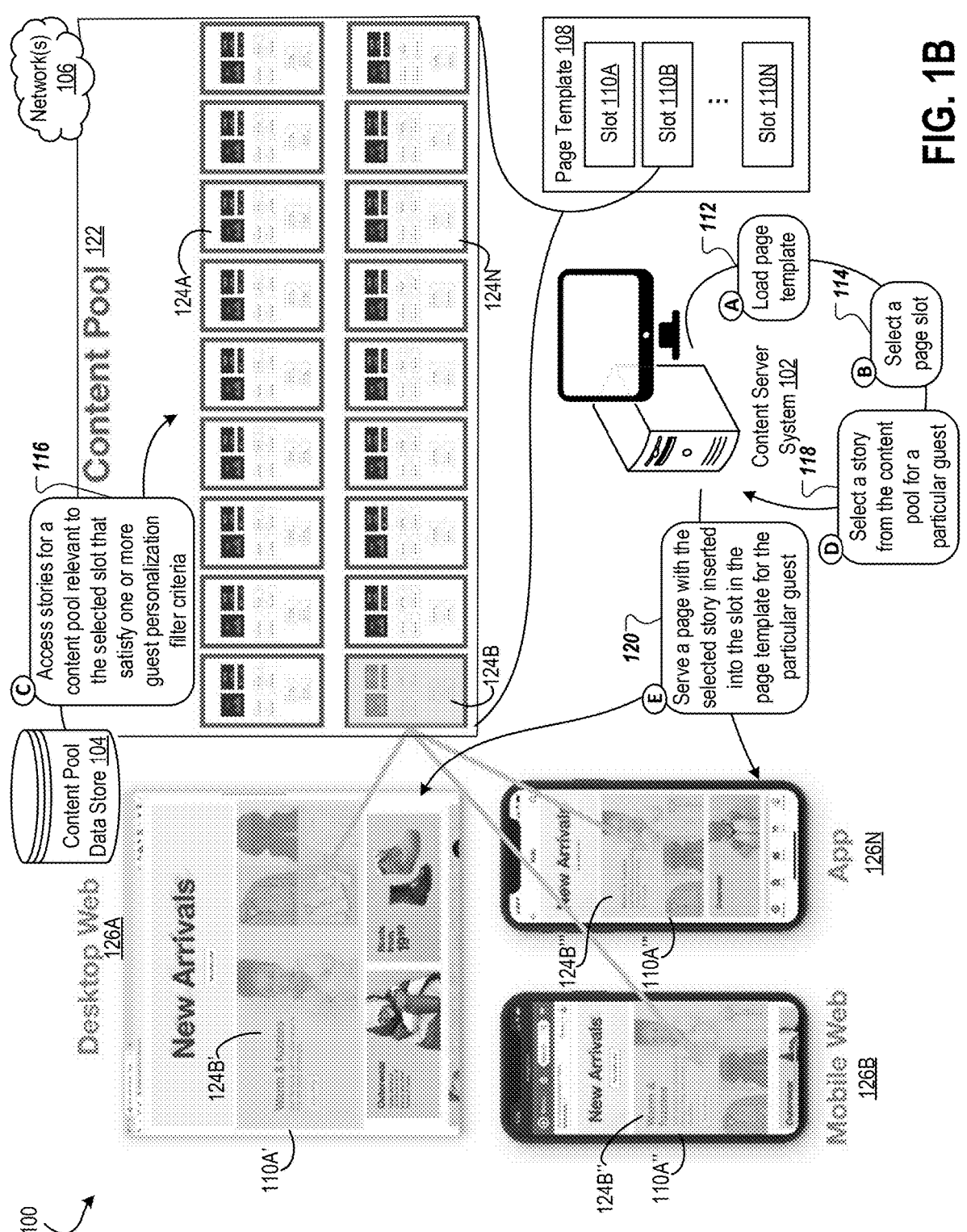
FIG. 1B is a conceptual diagram of a system for generating a page for an online retail environment with stories that correspond to a dynamically generated content pool.

FIG. 1B is a conceptual diagram of the system 100 for generating a page for an online retail environment with stories that correspond to a dynamically generated content pool 122. The system 100 can provide a front-end channel for receiving content and dynamically determining how to present the content and what content to present, regardless of a channel of presentation. The system 100 can be similar to a content API. The system 100 can include the content server system 102 and the content pool data store 104 that communicate (e.g., wired, wirelessly) via the network(s) 106. The server system 102 can be any type of computing system, cloud-based system, user device, computer system, and/or network of computing systems. The data store 104 can be any type of database, data repository, local memory/ storage of the server system 102, and/or cloud-based storage system.

The server system 102 can be configured to provide a development environment through which relevant users can create content to be served in pages in the online retail environment in one or more different channels 126A-N. The development environment can be used to generate, update, delete, or otherwise modify stories. The server system 102 can also be configured to determine what stories to present to what guests based on each of the guest's purchase history and/or interests, as described further herein.

The development environment provided by the server system 102 can additionally or alternatively be used to generate, update, delete, or otherwise modify pages that may display one or more of the stories and be served across the channels 126A-N. In some implementations, the server system 102 can automatically and dynamically generate, update, delete, or otherwise modify content pools that are maintained by the content pool data store 104. The server system 102 can generate and update one content pool having stories that are not channel-specific, but rather reusable stories that can be presented in multiple designs across multiple channels. The server system 102 can be configured to serve different information across different platforms, devices, systems, and/or channels. For example, the server system 102 can serve the content pool 122 to one or more different computing systems (e.g., devices of relevant users), the server system 102 can serve one or more selected stories 124A-N to one or more different computing systems (e.g., devices of relevant users), and/or the server system 102 can serve one or more generated pages to one or more different computing systems according to presentation/formatting standards of those computing systems (e.g., devices of end users of the online retail environment).

The content pool data store 104 can be configured to maintain a variety of information, which can be used by the server system 102 to generate content, such as the stories 124A-N and pages in the online retail environment. The data store 104 may also maintain and dynamically update the stories 124A-N and the content pool 122 to then be readily served across different platforms, both within an enterprise (e.g., for content creators of the online retail environment) and for end users (e.g., for the guests described herein).

The server system 102 can load a page template 108 in block A (112). The page template 108 can be loaded in response to receiving user input indicating a request to generate, create, edit, and/or build a page for the online retail environment. The page template 108 can include predefined slots 110A-N, which can provide consistency across pages that are generated and served for the online retail environment. The same page template 108 can be used to generate any pages for the online retail environment. The page template 108 can be dynamically modified and/or updated over time by the server system 102 to provide continuously improved experiences for end users, such as guests, interacting with the online retail environment.

The server system 102 can select one of the slots 110A-N in the page template 108 (block B, 114). The server system 102 can receive user input indicating selection of the slot, such as slot 110A. The selected slot 110A can be one that has a mini pool of stories (e.g., a subset of the stories) from the content pool 122, where the mini pool is associated with attributes of the selected slot 110A. The server system 102, for example, can determine associations between the slots 110A-N and the content pool 122 to generate a mini pool of stories for each slot. These associations can be based on attributes of stories in the content pool 122 and/or attributes of the slots 110A-N (e.g., links, classification, categorization, etc.).

In the example of FIG. 1B, the selected slot 110A has at least one associated mini pool of stories from the content pool 122. The server system 102 can access, from the content pool data store 104, the stories 124A-N from the content pool 122 that are relevant to the selected slot 110A and that satisfy one or more guest personalization filter criteria (block C, 116). Refer to at least FIG. 1A for further discussion about identifying the stories that satisfy the one or more guest personalization filter criteria. In some implementations, for example, the blocks in FIG. 1B can be performed after the server system 102 returns the at least one story 125 in block I (146) in FIG. 1A.

The stories 124A-N accessed in block C (116) may be previously generated/created and may have a same or similar classification type to one another. The stories 124A-N may also have a same or similar classification type to that of the selected slot 110A and/or the guest personalization filter criteria or other guest interests/purchase data. Classification type can be a derived attribute about a story based on where the story lands (e.g., what the story links to), as discussed at least in reference to FIG. 1A. If, for example, the slot 110A is designed only for deals, then only the stories 124A-N that are classified as deals may be selected for the slot 110A. Inputs and other attributes associated with each of the stories 124A-N, such as links to other pages, items, or locations in a site, can be assessed by the server system 102 to determine a classification type for the story. Similarly, each of the stories 124A-N can be assigned or otherwise associated with a categorization. The categorization can be determined based on where the stories 124A-N live in the site taxonomy, as described at least in reference to FIG. 1A.

In some implementations, the stories 124A-N can be selected for a particular slot in a page template based on those stories 124A-N satisfying one or more filter criteria, such as the guest personalization filter criteria. The filter criteria mad additionally or alternatively include classification, categorization, and/or a combination thereof. Various other attributes, inputs, and metadata may also be used as the filter criteria. For example, the stories 124A-N can be selected that have a same or similar expiration date. The stories 124A-N can be selected that have same or similar links to particular products, deals, or other pages in the online retail environment. The stories 124A-N can be selected that have a highest similarity to most recently-purchased products of a particular guest and/or group of guests. The stories 124A-N can have a same or similar link(s) to that of the selected slot 110A.

The server system 102 can select one of the stories 124A-N from the content pool 122 for a particular guest in block D (118). As described in reference to at least FIG. 1A, the server system 102 can select a highest ranking story for the guest. The server system 102 can select a story having a most similar product(s) to one or products that the guest purchased over a past predetermined period of time (e.g., a past day, a past week, a past month, a past 6 months, etc.).

In block E (120), the server system 102 can serve the page with the selected story 126B inserted into the selected slot 110A in the page template 180 for the particular guest. The server system 102 can serve the page to one or more of the channels 126A-N. The channels 126A-N can include, for example, a desktop web channel 126A, a mobile web channel 126B, and/or a mobile application channel 126N. One or more other channels can also be designated and used for presenting the page(s) for the online retail environment. The server system can serve the page to the particular channel associated with the particular guest's computing device. For example, the guest's device can request the page from the content server system 102. The request can include device-identifying information, which may indicate the channel associated with the requesting device (e.g., if the guest's computing device is a laptop computer, the request can include information identifying the device as corresponding to the desktop web channel 126A).

As shown in FIG. 1A, the same story 124B can be served and automatically presented differently in each of the channels 126A-N based on presentation/formatting standards of those channels. For example, in the desktop web channel 126A, the story 124B can be presented as story 124B' in selected slot 110A', in which the selected slot 110A' is automatically presented in a wide, landscape ratio/arrangement relative to other components in the page. In the mobile web channel 126B, the story 124B can be presented as story 124B" in selected slot 110A", in which the selected slot 110A' is automatically presented in a narrow, portrait landscape ratio/arrangement relative to other components in the page and in comparison to the selected slot 110A' in the desktop web channel 126A. The story 124B" is similarly automatically adapted to fit the selected slot 110A" in the mobile web channel 126B. In the mobile app channel 126N, the story 124B can be presented as story 124B''' in selected slot 110A''', in which the selected slot 110A' is automatically presented in a narrower, portrait landscape ratio/arrangement relative to other components in the page and in comparison to the selected slot 110A' in the desktop web channel 126A and the selected slot 110A" in the mobile web channel 126B. The story 124B''' is similarly automatically adapted to fit the selected slot 110A''' in the mobile app channel 126N.

In some implementations, blocks A-E (112-120) can be performed as querying operations by the server system 102. Information from performing each block can then be provided to another computing system, such as a computing device of a content creator or other member of an enterprise providing the online retail environment to end users, such as guests. The information can additionally or alternatively be provided to end user computing devices, such as a guest computing device described herein.

Figure 2A:
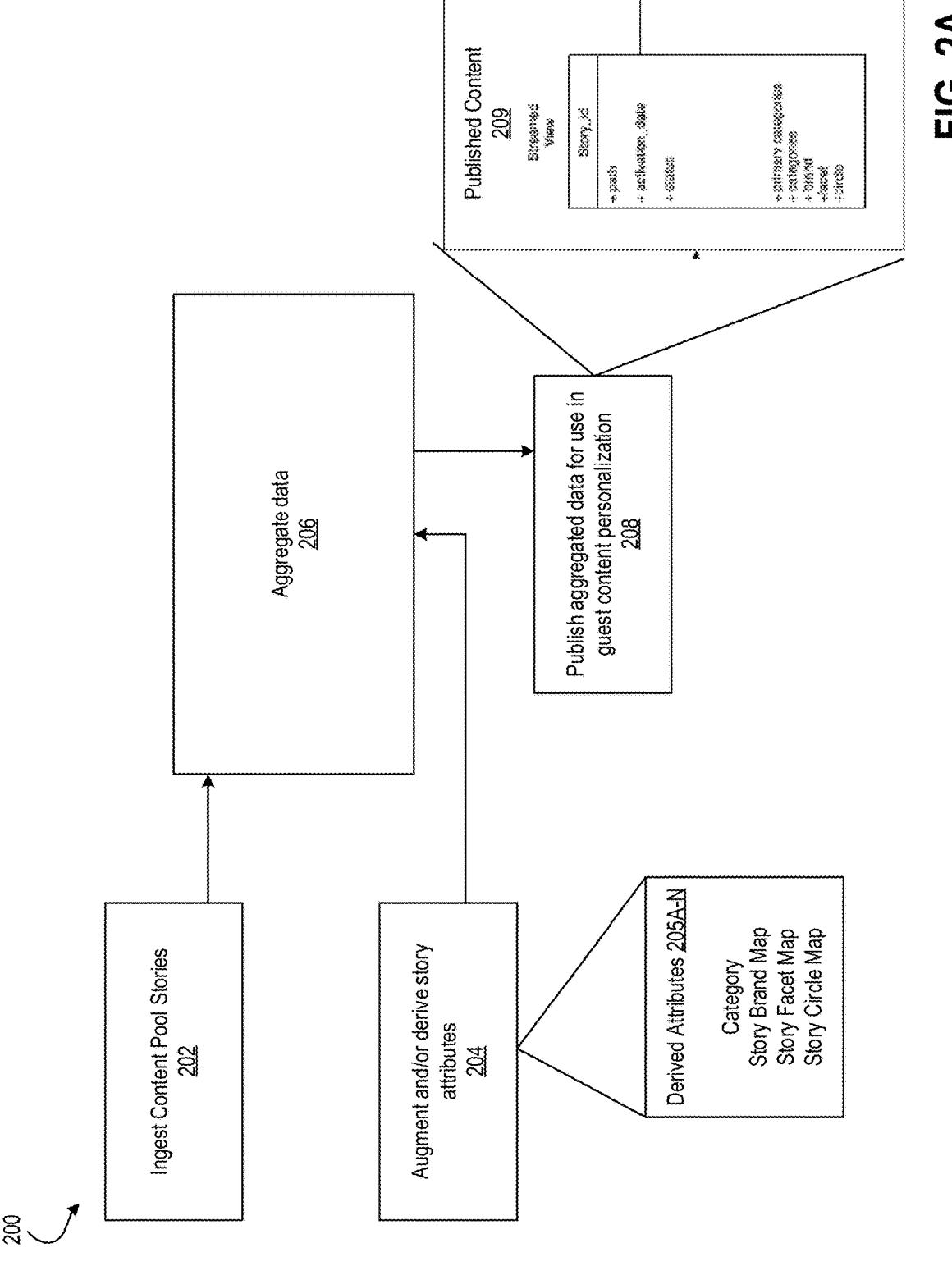
FIG. 2A is a conceptual diagram of operations that can be performed by a computer system to generate content stories that can be selected for guest content personalization techniques described herein.

FIG. 2A is a conceptual diagram of operations 200 that can be performed by a computer system, such as the content server system 102, to generate content stories, which can be selected for guest content personalization techniques described herein. The operations 200 may be performed as party of a guest story similarity algorithm (e.g., the GSS model described herein) to automatically identify stories that are most similar to products a guest has previously purchased or expressed interest in, with favor given to recency and frequency of that purchase/interest. To achieve this, the operations 200 can include separately comparing story-product similarity using embeddings and a guest-product score. The story-product similarity and the guest-product score can be combined to generate a total guest-story score. This approach may be based in part on collaborative filtering approaches by leveraging embeddings to calculate similarity. A benefit of averaging embeddings of linked products in a story is that the embeddings may be fast and simple to represent what the story is about/links to in the retail environment.

As shown and described herein, the operations 200 facilitate ingestion (202), augmentation and derivation (204), aggregation (206), and publication (208) of content data. The operations 200 may provide a single view architecture. The single view can be a unified view of guest personalization content data. Accordingly, all guest purchase data, story data information, and derived attributes by personalization may be combined into a single view for particular content. This may advantageously remove a need for an API that combines these data views. This approach may also streamline the addition of new filters in the operations 200.

The operations 200 can include ingestion of content pool stories (202). Data associated with active stories in the content pool can flow into the server system 102 from the content pool data store 104.

The ingested data can be parsed and aggregated in 206 by the server system 102. The server system 102 can also identify and select one or more attributes of the ingested data that are of interest for personalizing what content is presented to particular guests of the online retail environment.

The aggregated data can then be published in 208 as content to a personalization content Kafka topic. The published content can then become available for consumption by downstream applications, operations, systems, etc. The published content can be available in a streamed view 209, which various attributes that may be used in the guest content personalization operations described herein. Those attributes may include, but are not limited to, a story identifier, path, activation date, status, primary categories, categories, brand, facet, circle, etc. In some implementations, the streamed view 209 of the published content can be augmented by the server system 102. The published content can be updated with categorization data. Metadata of the published content can be enriched with content linking to one or more different types of pages (e.g., offer pages). The published content can be augmented with a combination of classifications and categorizations for more accurate selection and presentation to particular guests.

Augmentation techniques (204) may also be performed by the server system 102 as part of the operations 200. Data published to the personalization content topic in 208 may be used as input to generate derived attributes 205A-N. The derived attributes 205A-N can include, but are not limited to, category, story brand map, story facet map, and/or story circle/promotion map. These attributes may not originally be ingested with the content pool stories in 202 and therefore may be determined by the server system 102. Once derived, the attributes 205A-N can be exported or otherwise published (208) to another personalization content topic for derived attributes (or the same one). In some implementations, the augmentation techniques 204 can be applied to the ingested content pool stories and/or the aggregated data after performing 202 and/or 206.

The derived attributes can be published by the server system 102 and used by the server system 102 (or another computing system) to determine guest purchase habits and interests. The derived attributes may be used by the server system 102 to match stories having similar products to the guests for presentation in the online retail environment at the guest's computing device.

The derived attributes can, in some implementations, be fed back to one or more data stores maintaining the content pool and can be used with other rules, algorithms, and/or models to create and/or modify and/or select content stories for different guests in the online retail environment.

Figure 2B:
FIG. 2B is a flow diagram of a process for determining a guest story similarity score using the disclosed techniques.

FIG. 2B is a flow diagram of a process 210 for determining a guest story similarity score using the disclosed techniques. The process 210 can be performed by the content server system 102 described herein. The process 210 may also be performed by one or more other computing systems, computing devices, network of systems/devices, and/or cloud-based systems. For illustrative purposes, the process 210 is described from the perspective of a server system.

The process 210 may include one or more sub-processes: determining a decayed score for guest product purchases (bock 212), determining a story to product similarity score (block 214), and determining, based on the decayed score and the similarity score, a total decayed story similarity score for the guest (block 216).

The blocks 212, 214, and 216 are performed using content pool stories, product data, and guest purchase data retrieved from one or more data repositories. The server system may perform calculations and apply machine learning models and/or algorithms to interpret/transform the data. Interpreting and transforming the data can include deriving attributes, such as categories, brands, facets, and/or promotions. Facets may be similar to filters and may be part of a content story's metadata. Taxonomy links, for example, can include facets.

Figure 2C:
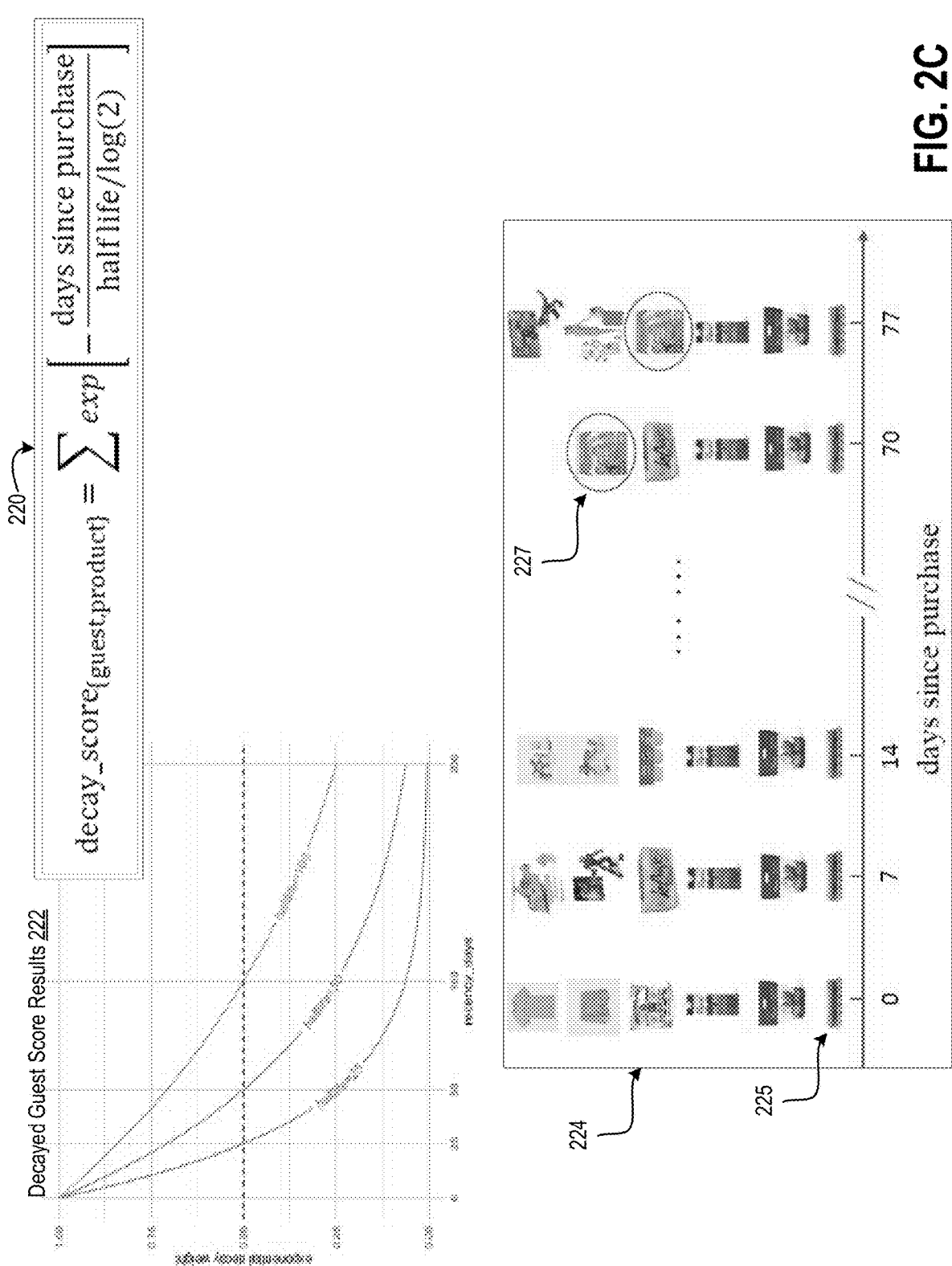
FIG. 2C illustrates techniques for generating a decayed product score for a guest, which can be used to determine the guest story similarity score of FIG. 2B.

In brief, determining the decayed score for guest product purchases (bock 212), can include retrieving guest purchase history data from a data repository, performing an exponential decay calculation on the retrieved data, and generating, for each guest, a decayed guest to product score based on the exponential decay calculation. The decayed guest to product score can be stored in association with a guest profile identifier and a product identifier. Refer to FIG. 2C for further discussion.

Figure 2E:
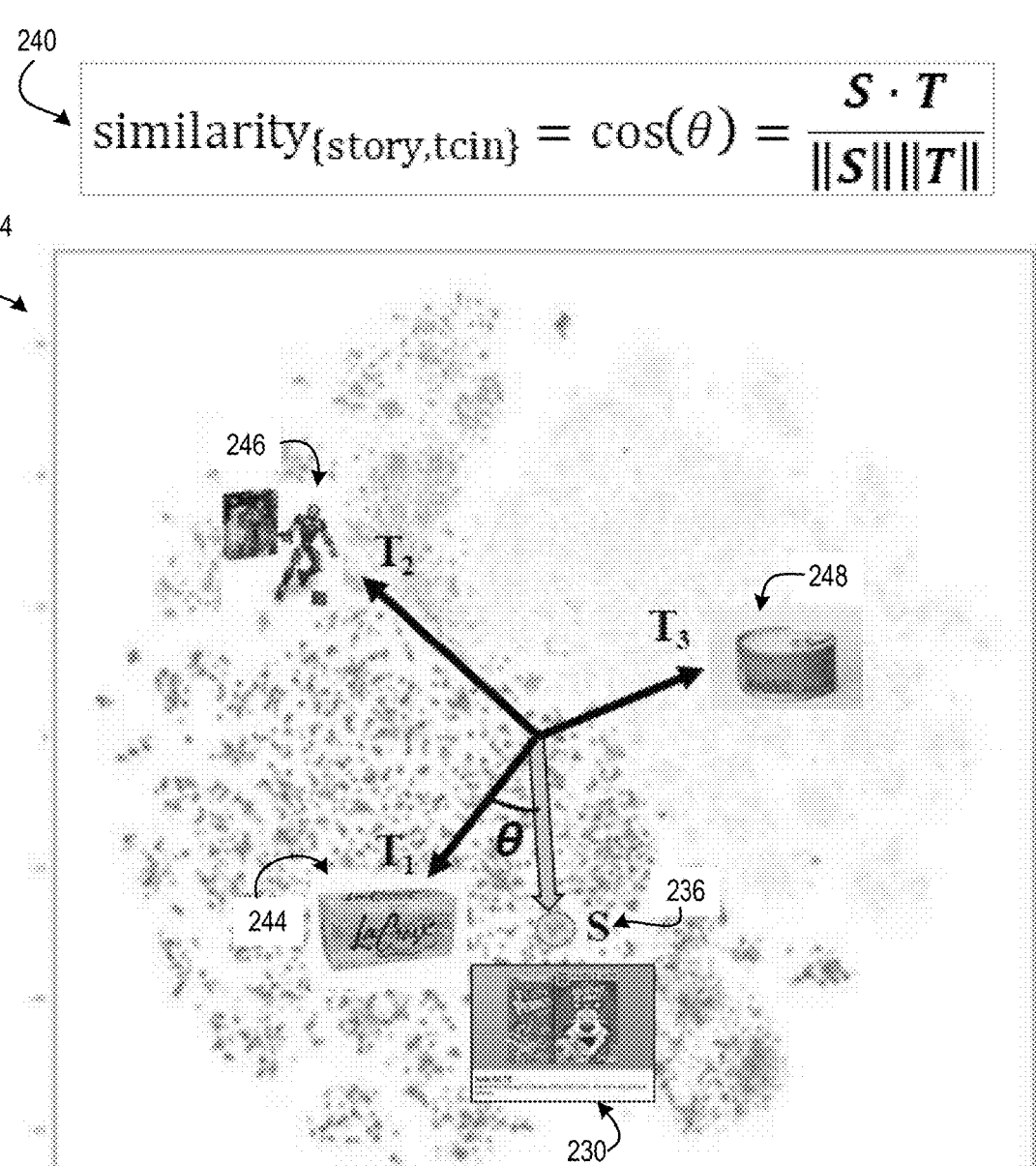
FIG. 2E illustrates techniques for determining story similarity, which can be used to determine the guest story similarity score of FIG. 2B.

Determining a story to product similarity score (block 214) can include retrieving, from one or more data repositories and for each guest, story to product identifier mapping(s), product identifier embedding(s), and product identifier category mapping(s). The server system can join the retrieved data, to generate a story embedding data object and a product identifier embedding data object. The story embedding data object can include an associated content story identifier, a categorization (e.g., L1), and an average embedding for the story. The categorization can be based on an hierarchy for the online retail environment. L0, for example, can be a home page categorization, L1 can be a first level under a root (e.g., clothing, shoes, and accessories), L2 can be a second level under the root, etc. The average embedding can be a numerical vector, which can be an average of numerical vectors associated with items that are linked to the story. The product identifier embedding can include a product identifier, an associated categorization (e.g., L1), and an associated embedding. The server system can perform a join operation on the categorization (e.g., L1), calculate a cosine similarity, and then filter the similarity using one or more guest personalization criteria to generate a similarity score between the story and the product identifier. A story to product identifier similarity data object can be formed as a result. This data object may include a similar story identifier, a product identifier, and a similarity indicator, such as the similarity score between the story and the product identifier. The similarity indicator can be the similarity score. The similarity indicator can scalable and a numerical value. The similarity indicator can be a positive or negative value, where a larger positive number may indicate a higher degree of similarity and a smaller positive number or a larger negative number may indicate a lesser degree of similarity. The similarity indicator, as described herein, can be used to rank stories based on similarity and/or select a most similar story for presentation to a particular guest or group of guests. Refer to FIGS. 2D and 2E for further discussion.

Figure 2F:
FIG. 2F illustrates techniques for determining the guest story similarity score of FIG. 2B.

Determining, based on the decayed score and the similarity score, a total decayed story similarity score for the guest (block 216) may include joining on the product identifier, a sum of the decayed guest score to product score multiplied by the similarity score. In some implementations, a cosine similarity score may be determined between the decayed guest score an the story similarity score. The server system can generate the total decayed story similarity score for the guest as a result, as a data object. This data object may include the guest profile identifier and the story identifier. Refer to FIG. 2F for further discussion.

FIG. 2C illustrates techniques for generating a decayed product score for a guest, which can be used to determine the guest story similarity score of FIG. 2B. FIG. 2C further illustrates block 212 described in reference to FIG. 2B. An exponential decay formula 220 can be used by the server system 102 to determine decayed guest score results 222 for a particular guest. The resulting score can be determined for each product purchased by the guest over a predetermined period of time (e.g., a past day, a past week, a past month, a past 6 months). The server system 102 may also weigh the particular guest's purchases based on frequency and recency of such purchases. Such weights can be applied using the formula 220 to determine the decayed product score for the particular guest. The decayed product score can therefore take into consideration what the particular guest bought and when the guest made that purchase or purchases.

A timeline 224 shows example products that the particular guest purchased from a current day (day 0) to a past day, day 77. A product 225 are eggs, which are shown in the timeline 224 as being purchased every time by the guest over the last 77 days. On the other hand, a product 227 can be a toy, which has only been shown as being purchased by the guest over 70 to 77 days after the current day. Because the guest has not purchased the product 227 with as great frequency or recency as the product 225, the product 227 may be weighted less and have a lower decayed product score than the product 225.

FIG. 2D illustrates techniques for determining story embedding, which can be used to determine the guest story similarity score of FIG. 2B. FIG. 2D further illustrates block 214 described in FIG. 2B. The server system 102 may join data about products 232 that are linked to a particular story 230, which can then be used to generate a mapping of such products 232 in n-dimensional space. The server system 102 can join data such as a story to product identifiers map with product identifier embeddings and/or product identifier category maps. Joining such data can include generating an n-dimensional space map 234 that associates the story 230 to a list of products 232 that are identified in or otherwise linked to the story 230. In other words, the server system 102 may put the product 232 taxonomy into the n-dimensional space map 234.

The server system 102 can then calculate a story embedding 236 as an average of the product embeddings for the particular story 230. Calculating the story embedding 236 may include determining a distance between each of the products 232 and the story 230 in the map 234. The story embedding 236 can then be determined, by the server system 102, as an average of the distances. As another example, the story embedding 236 can be determined, by the server system 102, as a distance between the story 230 and the closest product 232 in the map 234. As yet another example, the story embedding 236 can be determined, by the server system 102, as a summation of one or more of the distances between the story 230 and one or more products 232 in the map 234 (e.g., one or more products that satisfy one or more selection criteria, such as distance to the story 230, similarity in facets, categories, classifications, links, promotions, etc.).

FIG. 2E illustrates techniques for determining story similarity, which can be used to determine the guest story similarity score of FIG. 2B. FIG. 2E refers to block 214 described in FIG. 2B. The server system 102 can determine how each product having some similarity/association to a particular story may be interrelated and/or related/similar to guest purchases. The system 102 can leverage guest purchase history over a past year or other predetermined period of time to determine the story similarity.

The server system 102 can calculate a similarity score/ value 236 between each product (e.g., products 244, 246, and 248) and the story 230 in the n-dimensional space map 234 by taking a cosine similarity of the corresponding product embeddings described in at least FIG. 2D and using a similarity formula 240. Therefore, the server system 102 can determine a mathematical correlation between the different product embeddings and the story 230. The server system 102 may also filter out less similar products, such as the product 246 (e.g., a toy) and the product 248 (e.g., pet food) using one or more filter criteria and/or one or more similarity thresholds. For example, the server system 102 may define a threshold for cosine similarity. As shown in FIG. 2E, the remaining product 244 (e.g., a beverage having similar colors and/or qualities as the cereal boxes presented in the story 230) has a closest and/or best similarity value 236 with the story 230.

The server system 102 may use the GSS model described herein to determine the similarity value 236. The GSS model can also model and weigh guest purchasing interests based on frequency/recency to determine the similarity value 236 and/or identify which of the products 244, 246, and 248 may be most similar to the guest's purchasing interests and/or the story 230. The server system 102 may determine multiple similarity values 236 for the story 230 and products that are of interest to the guest, as shown in FIG. 2E, then identify a largest commonality between the determined similarity values 236 and those products 244, 246, and 248, the largest commonality being used to determine whether to select the story 230 (or a different story) for personalization of content presented in the online retail environment at the particular guest's computing device. The techniques and operations described herein can be performed by the server system 102 for each guest in the online retail environment.

FIG. 2F illustrates techniques for determining the guest story similarity score of FIG. 2B. FIG. 2F refers to block 216 described in FIG. 2B. The server system 102 can calculate the final guest story similarity score using a formula 250 and based on the calculations/operations described and performed in FIGS. 2C, 2D, and 2E. The resulting guest story similarity score can be used to rank stories in a content pool 252 for a particular guest. A top/highest ranked story can be returned for and presented at the guest's computing device. Sometimes, multiple top/highest ranked stories can be returned for final selection and presentation to the corresponding guest.

In the illustrative example of FIG. 2F, various content stories 253A-N have been selected from the content pool 252 and ranked for each guest 254 and 256, based on their respective purchase history and/or interests data. Here, the story 253B (related to water toys) is most relevant for the guest 254 and has been ranked first for the guest 254. This selection and ranking may be based on the story 253B receiving a highest guest story similarity score amongst the stories 253A-N when analyzed against the guest 254's purchase history. The story 253C (related to on-sale cereals) is ranked second most relevant story for the guest 254 and the story 253E (related to on-sale bicycles) is ranked third most relevant story for the guest 254. For the guest 256, the story 253C is ranked first most relevant, the story 253N (related to products that, when purchased, cause the guest to receive a free gift card) is ranked second most relevant, and the story 253D (related to on-sale ice cream) is ranked third most relevant. As shown in FIG. 2F, the same stories 253C can be identified for different guests and ranked differently based on each guest's purchase history and/or interests.

Figure 3:
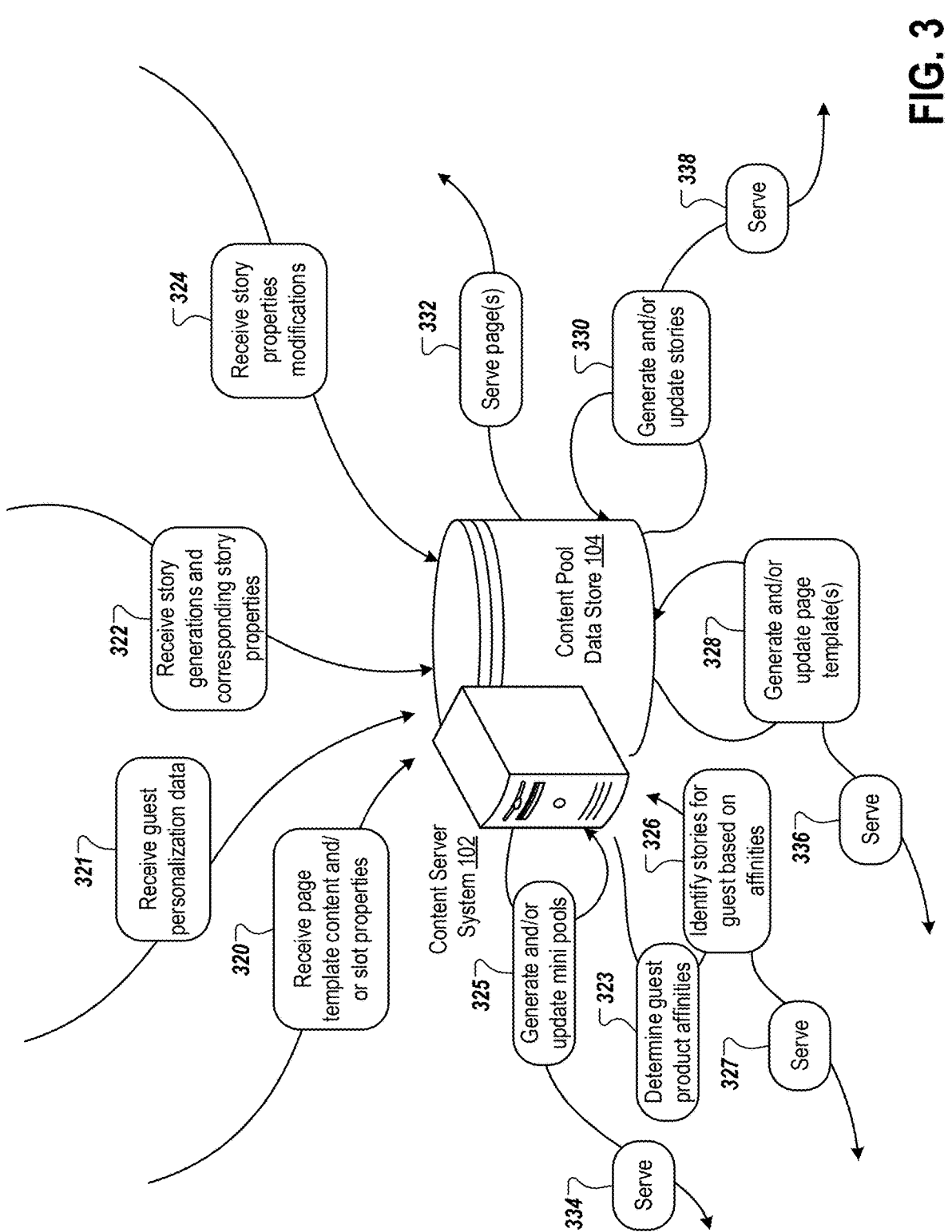
FIG. 3 is a conceptual diagram of a content pool data store that can dynamically generate, modify, maintain, and/or serve stories, content pools, page templates, and/or pages for different platforms and for different guests.

FIG. 3 is a conceptual diagram of the content server system 102 and the content pool data store 104 that can dynamically generate, modify, maintain, and/or serve stories, content pools, page templates, and/or pages for different platforms and for different guests. As described herein, one or more users of an online retail environment can generate content for page templates and/or properties or other data for slots presented in the page templates (block 320). Page templates that are maintained in the data store 104 can be updated or otherwise generated using the content and/or slot properties (block 328), then served to one or more users in an enterprise (e.g., content creators). The page templates can be served to computing devices of the users that generated the content and/or slot properties. The page templates can also be served to computing devices of other users who use the page templates to generate pages for the online retail environment.

One or more of the users can generate stories and properties (e.g., attributes, inputs, links) for the stories, which can be received and stored in the data store 104 (block 322). The stories can accordingly be generated and/or updated (block 330), then served to one or more computing devices (block 338). One or more of the users can additionally or alternatively update story properties, which can be received by the data store 104 (block 324). The stories can accordingly be updated (block 330), and then served (block 338).

The server system 102 can receive guest personalization data (block 321). Using this received data, the server system 102 can determine guest product affinities (block 323). In other words, the server system 102 can determine what products each guest may be interested in purchasing and/or viewing based on mathematical correlations between the guest's previous purchases/behavior and products that are linked to/embedded in the stories maintained in the content pool data store 104. Refer to FIGS. 2A, 2B, 2C, 2D, 2E, and 2F for further discussion about determining the guest product affinities.

One or more mini pools can be generated and/or updated (block 325). The mini pools can include subsets of the stories that are part of the content pool maintained in the content pool data store 104. A mini pool can be generated using one or more guest personalization criteria. For example, the server system 102 can identify stories for each guest based on their respective product affinities (block 326). The identified stories can then be added to the mini pool (block 325), then served to the one or more computing devices (block 334). In some implementations, only one story may be identified (e.g., a story with one or more linked products that is most similar to the particular guest's purchase history/behavior) in block 326 then served (block 327) to a computing device of the particular guest.

As another example, the mini pools can be generated and/or updated (block 325) for particular slots in the template for a page being developed, with or without determining each guest's product affinities (blocks 321, 323, 326, 327). Such mini pools can then be served to the one or more computing devices (block 334), for example, in response to receiving a request from a computing device of a user to add a story to a DEALS slot in the page template for a page that is being developed. One or more of the developed pages can also be served (block 332) to computing devices of the relevant users and/or computing devices of end users, such as guests interacting with the online retail environment.

Sometimes, a search query can be provided by a user for a DEALS slot in a particular page. The server system 102 can run the search query on the content pool data store 104 to identify relevant stories and dynamically generate and serve a mini pool of the relevant stories. Sometimes, the server system 102 may also use one or more guest personalization criteria, such as the guest product affinities, to run the search query and/or further hone in on what stories are identified for and served in the mini pool. Because the dynamic nature of the disclosed techniques, relevant content can be quickly identified and readily provided to the user to generate relevant pages for an online retail environment or other online platform. Such content can further be relevant to a particular guest's product affinities to provide a more personalized experience for the guest in the online retail environment.

Over time, any of the page templates, slot properties, stories, story properties, mini pool parameters, and/or guest product affinities can be modified or adjusted over time. These modifications can be reflected across all queried instances so that all the users can dynamically receive relevant, updated, and uniform content. Feedback from one or more users may also be received and utilized by the server system 102 to tweak parameters of the page templates, slots, stories, and/or mini pools, which further lends to the dynamic nature of the disclosed techniques.

FIGS. 4A and 4B are a flowchart of a process 400 for determining a story to present for a particular guest across different platforms. The process 400 may be performed to provide unique content in stories that align with the guest's purchase history and/or interactions with an online retail environment. The disclosed techniques may also ensure that the same stories are not recommended or shown across multiple pages in the online retail environment for the particular guest. As a result, the guest can be served various personalized content in different stories across numerous pages in the online retail environment to enhance the guest's shopping experience.

The process 400 can be performed by the content server system 102 described herein. The process 400 may also be performed by one or more other computing systems, computing devices, network of systems/devices, and/or cloud-based systems. For illustrative purposes, the process 400 is described from the perspective of a server system.

Referring to the process 400 in FIGS. 4A and 4B, the server system may receive input data in block 402. The input data can include content pool stories' link data (block 404), product attributes for each product in each content pool story (block 406), and/or guest interaction data (e.g., purchase data, historic interaction data, clicks, views, impressions) (block 408). In some implementations, the server system may receive data associated with the content pool stories and then determine, based on the received data, what products are linked or otherwise associated with each story. The server system may then generate and/or retrieve the products attributes data for the linked products. Refer to at least blocks C and D (134 and 136) in FIG. 1A for further discussion about determining the product attributes for each story.

In block 410, the server system may categorize the received stories into a site taxonomy based on the respective product attributes and a predetermined categorization threshold value. The server system may identify which categories should be assigned to each story based on the attributes for products linked to or otherwise associated with the story.

The server system may leverage the taxonomy to infer categorization for each story. The site may be organized into a taxonomy pyramid. Products are attributed to a particular page in the taxonomy pyramid. If, for example, one searches for red heels, these heels can fit into a taxonomy level for shoes, and a story that includes those red heels can therefore be categorized as shoes. The taxonomy helps with contextual awareness to only serve content that pertains to a particular type of product that is associated with the story and/or that a guest may be interested in. Accordingly, the dynamic nature of the taxonomy allows the stories associated with the products to be categorized and attributed to different levels of the taxonomy. Contextual awareness of the story can also be derived from using the taxonomy. Likewise and as described further below, the taxonomy may be used to map stories to one or more guest affinities. For example, a story can link to a particular product page, which has multiple products attributed to it, and the guest may have a mathematically-defined affinity to at least one of the products attributed to that page. The server system can provide that page to the guest via the story since the guest is likely to be interested in the product and similar products presented in the page.

The server system can categorize a story into a particular taxonomy level based on how many products attributed to the story fit into a particular category/taxonomy level. This categorization can be made using the categorization threshold. In an illustrative example, the categorization threshold can be 30%, meaning that at least 30% of the products attributed to the story must fit into the particular category before the story can be categorized according to that category. The categorization threshold may also vary depending on the story, the type of product or products attributed to the story, and/or the type of story. As an illustrative example, a story that is intended to show various sales or deals in the online retail environment can have a lower categorization threshold than a story that is intended to show sales or deals for shoes (e.g., the first story may show the best sale or deal for different products across different categories).

The server system can also map the content pool stories to product identifiers based on their link type and/or link value. Taxonomy node (e.g., Category and Tag) links may be mapped using product identifier categories. Decision rules engine (DRE) facet filters may be applied if included in the data received in block 402. These facet filters may be used to further narrow what items or subset of items should be linked to a story and thus presented to a guest. The story can include filters and facet filters that may link the story to a particular page and an even smaller subset of items than all items that are linked to the particular page. Only the smaller subset of items is considered when recommending and presenting the story to a particular guest. The facet filters can include filters that may be used by guests when filtering and refining search results that show in the online retail environment. For example, the facet filters may include, but are not limited to, specific sizes, colors, brands, sub-categories of products, prices, reviews, etc. Thus, only items linked to the story that have those facet filters (e.g., specific size, color, etc.) may be presented to the guest. Brand links may be mapped via brand facet IDs of the product identifiers. Promotion IDs & similar offer links may be mapped based on promotion product information. One or more other category links may also be mapped to other offers and then from the offers to particular products.

In some implementations, block 410 can be performed in a separate process from the other blocks described in the process 400. Sometimes, the block 410 can be performed before, during, or after any of the other blocks described herein. As another example, the block 410 can be performed at a same or similar time as determining a guest's affinity categories (refer to block 416 described below).

The server system can determine whether at least a threshold information is known about the guest in block 412. If no information or very little information about the guest is known, then the server system proceeds to block 434 described below. The server system may determine that no information or very little information is known about the guest if the guest has not previously browsed the online retail environment, if the guest does not have an account or login information associated with the retail environment, if the guest has not previously shopping in a related physical retail environment, if the guest has only recently accessed and/or browsed the online retail environment, etc. If the server system has sufficient enough information about the guest, then the server system proceeds to block 414 and performs a guest personalization algorithm to determine what content to present to the particular guest. The server system may have at least the threshold amount of information for the guest if the guest has previously made purchases in the online retail environment and/or the related physical retail environment, if the guest has an account and/or login associated with the retail environment, if the guest has spent time browsing the online retail environment, if the guest has added items to an online basket/cart in the online retail environment, etc.

In block 414, the server system can retrieve a guest story similarity (GSS) model. The model can be used to determine guest-specific offers and eligible products strategies. The model can be trained on a large and robust sample of data, such as 14 months of sales transactions. The GSS model can be configured to calculate a similarity between products that a guest purchases (e.g., during a predetermined period of time, such as a last 6 months) and at least one (e.g., a set of) product associated with a story. The calculated similarity values can be used to generate a ranking of stories for each guest, where the ranking indicates which of the content pool stories are most relevant for the guest to least relevant. Similarity can be identified as whether the products purchased by the guest are purchased in a similar type of basket (in physical environment or online retail environment). As an illustrative example, if the guest buys different types of bagged salads on different trips but other products in those baskets were similar across all the trips, then the model may determine that there are similarities between the two types of salads that have been purchased by the guest. Similarity can further be determined using the model and based on item attributes (e.g., characteristics, such as physical characteristics, that purchased items have in common) and/or guest purchase patterns.

As described in reference to FIGS. 2A, 2B, 2C, 2D, 2E, and 2F, the GSS model can generate personalized science-based story recommendations as output. The GSS model may additionally or alternatively rank the stories by comparing the similarity of guest purchases to products associated with the stories. The model can process data such as the guest purchase data (block 408), guest sales trip data, and/or product data. One or more language processing techniques may also be used to translate different types of sales and/or behavior data that may be used by the GSS model to rank and determine the story or stories for the particular guest.

The server system may provide at least a portion of the received data as input to the GSS model in block 416. The model inputs can include metadata for the content pool stories (e.g., the content pool stories link data in block 404). The metadata can indicate activation and/or deactivation dates and link details for each story. The model inputs may also include applied filters to indicate category and/or classification of the story. The model inputs may also include product data (e.g., the product attributes in block 406), such as corresponding category and/or facets. The model can be trained to parse the link details in order to map the story to one or more product identifiers. The product data may also be used by the model to associate the story and the product identifiers through category and/or facet information. The model inputs may include transactional product embeddings. The embeddings described throughout this document generally may include a vector representation of discrete data learned by the server system, using techniques such as a matrix factorization or a neural network. The embeddings may be updated daily, which means that the model outputs may improve over time as more data accumulates for any particular product. The model inputs may include the guest purchase data in block 408, which can include store and/or online purchases over a past predetermined period of time that are associated with a member/profile identifier for the guest. Returns and non-retail transactions may be filtered out of the guest purchase data.

Accordingly, the server system may receive, as output from the model, guest affinity categories (block 418). Refer to at least FIGS. 2A, 2B, 2C, 2D, and 2E for determining the guest affinities (e.g., categories or products that the guest likely has interest in, which can be based on their purchase history and/or behavior in the online and/or physical retail environment). As described herein, guest affinity categories can be determined on a nightly basis for each guest of the retail environment. The guest affinity categories can be determined on one or more other predetermined time intervals, such as every 30 minutes, every hour, every 5 hours, every 12 hours, every 24 hours. The affinity categories can be determined based on historic behaviors of the guest in interacting with the online and/or physical retail environment. The affinity categories can identify what interests the guest may have based on their previous shopping and interaction patterns. If the guest has not previously interacted with either the online or physical retail environment (e.g., the guest does not log in or have an account with the retail environment when they engage with the retail environment), then the server system described herein may not be able to derive affinity categories for the guest. Rather, the server system may use crowd-based modeling techniques to identify interests that appear generally across multiple guests interacting with the retail environment and present stories related to those crowd-based interests.

In block 420, the server system can determine, based on the guest affinity categories, similarity scores for stories having products most relevant to the guest. Sometimes, the determination in block 420 may be performed using the GSS model and the most similar products may be provided as output from the GSS model.

As part of block 420, the server system can compute a product identifier to story similarity value as a cosine similarity between product identifier(s) embedding and the story embedding (e.g., an average over story-linked product identifiers). Sometimes, the server system may only compare product identifiers to stories that overlap with the product identifiers' primary L1 category in a site taxonomy. The server system may drop or otherwise eliminate product identifier-story pairs having a cosine similarity that is less than a predetermined threshold value (e.g., 0.3, 0.5, 0.7, 1.0). Refer to FIGS. 2D and 2E for further discussion.

The server system may also compute a guest to product identifier score as a purchase count weighted by recency using an exponential decay approach, which is further described in reference to at least FIG. 2C. Purchases that happened more recently can be given more weight than less recent purchases made by the particular guest. The server system may then compute a guest story score (which can then be used for ranking). The server system may retrieve all story similarities for the guest-purchased product identifiers and determine a final story similarity score as (guest-product identifier score * product identifier-story similarity score) summed across all of the particular guest's product identifiers. Refer to FIG. 2F for further discussion about determining the final story similarity score.

The server system may rank the stories based on their similarity scores for the guest (block 424). The server system can rank a top 100 stories for the guest. A story having the highest similarity score can be ranked at a top of a stories list for the guest. The stories can therefore be ranked from highest similarity score to lowest similarity score. The ranked stories can be pre-cached so that the stories may not be ranked during runtime. The pre-cached rankings can simply be received during runtime and used to efficiently select and present a top ranked story to the particular guest. The list of stories can further be filtered using one or more guest personalization filter criteria. The server system can filter based on determining whether each of the ranked stories fits into a correct category. For example, the server system can remove any of the ranked stories that do not correspond to deals in the online retail environment. As another example, the server system can remove any of the ranked stories that do not correspond to a particular category that is relevant to the particular guest.

In some implementations, block 424 can be performed at runtime, such as when a story is requested to be served in a page of the online retail environment to the particular guest. Sometimes, block 424 can be performed before runtime (e.g., during batch processing of any of the blocks 402-420). As an example, the stories can be ranked during the batch processing of any of the blocks 402-420 (before runtime). During runtime, once the server system receives a request to serve a story to the particular guest's computing device, the server system can perform filtering of the ranked stories to automatically select a best/appropriate story to serve to the guest. As described herein, as little processing as possible may be performed at runtime to provide efficient and targeted marketing content to the guest in real-time or near real-time. Runtime filtering therefore can be used to ensure whether, on a homepage or a clothing page or any other page in the online retail environment, the selected ranked story is appropriate for the guest's current location in the online retail environment (after all, the stories have already been ranked based on relevance to the interests of the guest, so during runtime, the server system only identifies a top ranked story that is relevant to the guest's current location in the online retail environment).

Accordingly, in block 426, the server system returns one or more of the ranked stories that satisfy one or more guest personalization filter criteria. The server system can return a top ranked selected story for presentation at the guest's computing device. The server system can sometimes return the one or more top ranked stories to another relevant user's computing device, such as a content creator. In some implementations, the server system may provide the ranked list of stories to the computing device of another relevant user, such as a content creator. The content creator can then go through the list of stories, modify any of the stories, and/or select one or more of the stories to be published and/or served to the particular guest's computing device (and/or one more other guest computing devices).

By returning the top ranked selected story to the guest's computing device, the guest may receive richer marketing content than if the server system merely transmitted information about a particular product that the guest should purchase. The disclosed techniques, on the other hand, can display one or more recommendations to the guest in the form of visual and engaging content, which may improve the guest's experience with the online retail environment and help them in making purchasing decisions. The disclosed techniques can improve the guest's experience by providing more of a discovery of similar products of interest to the guest for purchase.

Referring back to block 412, if the server system determines that an insufficient amount of information is known about the guest, the server system may perform block 434, in which the server system provides at least a portion of the received data as input to a seasonality model to identify seasonally relevant stories for the guest. The server system may use the seasonality model when the system does not have enough data about the guest to provide a personalized recommendation for the guest. The seasonality model can be trained to identify and serve sales for products that are linked to available (e.g., active) content pool stories, then rank those stories by their aggregated seasonal forecasted sales. The stories can be ranked for a predetermined period of time, such as an upcoming 7 days. The stories can be ranked based on their aggregated seasonal forecasted sales, from highest to lowest.

Generally, the model can receive, as inputs, historical sales data for a set of products associated with each content story. The seasonality model can then analyze the data against predetermined rules to determine when a particular product in the set of products has projected high sales and thus elevate that story for presentation over other stories linked to products having lower projected sales. Products having higher sales in a current season (e.g., higher relative to other products, higher than a predetermined threshold value and/or range) can be promoted more than products having lower sales in the current season. Therefore, a story that links to the higher sales product(s) can be ranked higher than other stories linking to the lower sales product(s). The seasonality model works well for determining what story to present to a guest where little to no information is known about that guest. Since stories may have a wide swatch of products behind them, so as long as some of the products in the story are older and have more history than other products, the older products can be used to determine which of the stories to rank based on seasonal sales.

Still referring to the seasonality model in block 434, the model can receive, as inputs, (i) active stories and their linked product identifiers (which may include all published stories that are currently active, stories that have at least 180 days or another predetermined amount of time of sales during a defined historic date range), (ii) a date range for which to forecast sales (e.g., a present day and for 7 upcoming days, or otherwise if specified a max deactivation date, which may be sooner than 7 days from the present day), (iii) a historic date range (e.g., 1,460 dates of sales history, which can be used to predict seasonal demand of the set date range), (iv) sales metric (e.g., number of transactions per product). These inputs may then be modeled to predict the seasonal demand of products for each stories in the upcoming specified date range. For all product identifiers related to the active stories, corresponding transaction history for the historic date range can be extracted, which may include, for each product, by day, a number of transactions, total sales volume, and/or total sales units. The model may be trained to aggregate the extracted product level sales data (e.g., transaction, total amount, and total units) to the story identifier level by each metric to an aggregated by story identifier, by day metric. For each period of sales, the model can be trained to fill in zero sales for dates with no sales history for the particular product. Overall, the model may include n different parts as scenarios.

For all dates in the training and scoring processes of the seasonality model (historical dates and future forecasting date ranges), the model can be trained to label each of those dates with calendar information, such as day of week, day of year, week of year, if it falls on/around an important holiday, whether a date is part of the training or scoring time period, etc. Such annotations can be beneficial to weigh model outcomes and/or scores. For example, if a particular product had an upturn of sales on a holiday, then the model may determine that the particular product is in higher demand during a season around the holiday rather than other seasons that do not include the holiday.

Sometimes, the server system may implement logic/algorithms/models to determine whether there is a ramp up period in a particular story's sales history. Such logic may indicate that a last period (date period with no more than 45 days of consecutive sales gap) of sales is at least over 365 days. There may be a trend of demand ramp up at the beginning of the period. The ramp up and post ramp up period may follow statistically different trends. Predicting the ramp up period sales may be more accurate using ramp up period data versus using post ramp up period sales. If the aforementioned conditions are met, the server system may identify a ramp up period, as well as which days/how many days fall under the ramp up period.

Sometimes, the server system can perform logic to determine whether there's sufficient information to use the seasonality model on a particular story. The logic may include determining that the last period is at least 365 days and a non-ramp up period is at least 365 days. If there are more than 2 years of non-ramp up sales, the server system can determine to add a year component to the seasonality model. If there is insufficient data to train and use the seasonality model, then the server system can train and implement a moving regression model to project future sales for the products associated with the particular story.

The moving regression model may be trained to smooth the sales trend over time by removing day of week, day of year, as well as holiday factors that may impact sales. The moving regression model may use a day index to predict the smoothed sales of a particular day, then use a flat prediction from last predicted value for future predicted sales. This trained model can then be fit into future data, by the server system, given subsequent day index, day of week, day of year, holidays, etc. information.

Unlike the moving regression model, the seasonality model can be trained to smooth the sales trend over time by removing the day of week, day of year, as well as holiday factors impact on sales. The model may be trained to further smooth the sales trend over time by fitting the smoothed sales in a moving regression model (e.g., local smoothing), then cross validate to configure the seasonal model's optimal hyper-parameters. Accordingly, the seasonality model can be trained and iteratively improved using the optimal parameters, then cross-validated using different parts of the sales period's prediction(s).

If the guest is unknown, as described in block 412, the server system can identify at least one newest story in the content pool that satisfies one or more guest filter criteria (or other filtering criteria) in block 436. The server system can implement a newest story model and/or algorithm as a fallback strategy to determine what story or stories to recommend from the content pool for a particular guest. The server system can rank all stories in the content pool that are identified as active, and select the ranked story with the latest activation date, which can also be considered the newest story that is active and added to the content pool. If there are multiple stories with the same date, the server system may select one of those multiple stories randomly.

A newest story model can be trained to recommend stories in reverse chronological order of their activation release date. In other words, the newest stories model can be configured to rank stories by their respective active date. The model can receive, as data inputs, metadata for each story in the content pool (or a subset of stories in the content pool, such as stories that are identified as active). The metadata can indicate activation/deactivation dates, status, and/or product link details for the respective story. The model can analyze the data inputs to identify which stories have an activation date that is current and/or a story status of being published (both of which may indicate that the story is currently active). The model can then rank those identified stories using descending activation date (e.g., higher rank given to later activation date). If multiple stories have the same activation date, the model may rank those randomly or otherwise select and serve one of those multiple stories at random. Output from the model can include the highest ranked story amongst the active stories in the content pool.

Sometimes, the server system may apply one or more filter criteria in block 436 to select an active story that is relevant to a particular page that the guest is browsing in the online retail environment. The one or more filter criteria may be used, in some implementations, to identify active stories that pertain to deals or other types of stories that may be desired/displayed in the particular page that the guest is browsing.

Both blocks 434 and 436 may be performed when the server system determines that the guest is unknown in block 412. In some implementations, only one of the blocks 434 and 436 may be performed.

In some implementations, the server system can receive user input indicating selection of the seasonality model or the newest story model, then implement the user-selected model. As an illustrative example, a story creator or other relevant user can choose the newest story model to provide a story to relevant guests. In some implementations, the story creator can set a particular story to be presented when the newest story model is used. As an illustrative example, camping story pages may not need personalization since the retail environment may not have a big variety of products to choose from and/or guest interest in camping products. As a result, when a camping story is created, it can be pushed to a top of a ranked newest stories list so that it can be served to one or more guests who are unknown.

The server system may then return one or more of the identified stories from blocks 434 and/or 436 for the particular guest (block 438). Refer to block 426 for further discussion about returning the identified story or stories.

FIG. 5A is a flowchart of a process 500 for determining a story to present for a particular guest using click-through modeling techniques. The process 500 may be performed to assess a guest's clicks and interactions with an online retail environment to determine or otherwise predict what products guest may be interested in. The click-through modeling described herein can be used in combination with the GSS model described above, or any other modeling techniques described herein, such as the seasonality model and/or the newest story model. For example, output from the GSS model may be leveraged in the process 500 to improve outcomes and personalization of stories for guests. In some implementations, the click-through modeling techniques of the process 500 may be performed instead of any one or more of the GSS model, the seasonality model, and/or the newest story model. For example, the click-through modeling techniques of the process 500 may be preferred over the GSS model in scenarios where a guest has not purchased products in the online retail environment but has visited various pages in the online retail environment, clicked on different stories and/or products presented in those pages, added products to a wish list and/or an online basket/cart, etc. The GSS model may be preferred when additional or other information about the guest is known, such as purchases they have made in the online retail environment and a related physical retail environment.

The process 500 can be performed for each guest in the online retail environment. The process 500 can be performed by the content server system 102 described herein. The process 500 may also be performed by one or more other computing systems, computing devices, network of systems/devices, and/or cloud-based systems. For illustrative purposes, the process 500 is described from the perspective of a server system.

Referring to the process 500 in FIG. 5A, the server system may receive input data (e.g., for each guest) in block 502. The input data may include output from the GSS model (block 504) and/or historic guest purchase and browsing data (block 506). For example, the input data may include an impression ID (e.g., a shopping journey where the guest viewed a particular story in the online retail environment), a story identifier, a partition date (e.g., date of the impression), a click/non-click action indicator, a node identifier (e.g., placement node of the story), a target indication (e.g., type of link such as promotion, taxonomy), a product identifier count (e.g., a quantity of products mapped to the story), a link node (e.g., a page the link leads to), a channel (e.g., a platform, such as web and/or app), an L2 category product identifier count (e.g., a number of product identifiers mapped to each L2 category), one or more facets (if the story has facets), and/or a promotion (if the story has a promotion). The historic guest purchase and browsing data (block 506) may include, for each guest, historic purchase data, click data, actions to place products in the online basket/cart, other expressions of interest that may be captured in the online retail environment, etc. Click actions made by the guest in the online retail environment may be tracked using tagging techniques to directly learn from performance of historical stories (such as determining how many guests clicked on a particular story and or added a product linked to the story into their respective online baskets/carts). Impressions and clicks can be recorded at unique combinations of one or more of channel, page (e.g., node), story ID, day/other time information, and/or guest profile. Any guest interactions with the online retail environment can be tracked and provided in block 502. Thus, the guests impressions can be continuously collected. Although all the guest interactions may be tracked and collected, the server system may only use the interactions associated with particular events (e.g., content clicks, item views) to determine intent mapping for the guest.

The server system can retrieve a click-through model in block 508. The model can be retrieved from a database, data store, or other type of data repository. The model may be stored in local memory/storage for quick retrieval in block 508.

The model can be trained with a variety of data in multiple dimensions. Refer to sparse matrix 550 in FIG. 5B for additional details. The training data can also be accessed for a predetermined period of time, such as a past 6 months. The training data dimensions may include but are not limited to L2 category features, link nodes, placement node identifiers, slot ranks, targets, and/or channels. As an illustrative example, the model can be trained on approximately 20,000 features. As another example, the model can be trained on approximately 109 million records indicating numbers of sessions (e.g., click/non-click). The model can further be trained on different types of stories that guests have inter-acted with in the past (e.g., over a predetermined period of time), such as stories with a particular placement in slots on a page in the online retail environment. Various other variables (e.g., store and/or online sales and browsing activi-ties) about guest engagement can be used to train the model to predict what products the guest may be interested in, now or at a future time.

In block 510, the server system may provide at least a portion of the received data as input to the model. The input may include information for stories that the particular guest has clicked on during a predetermined period of time (e.g., a past week, a past day, a past month, a past 6 months). The input may additionally or alternatively include the guest's browser path history over the predetermined period of time (or another time period). The input may additionally or alternatively include search terms used by the guest over the predetermined period of time (or another time period).

The server system may receive, as output from the model, a prediction of products of interest to the guest based on analysis of guest engagement with the online retail environ-ment in the received data (block 512). In some implemen-tations, the model can be run at predetermined time inter-vals, such as on a nightly basis and/or every 10 hours, 12 hours, 24 hours, etc. The model may be trained to generate correlations between different products that the guest clicks on, views, or otherwise engages with products that are linked to one or more content pool stories (active stories, deactivated stories, or a combination thereof). The model may also generate a score, similar to the similarity score described in reference to the GSS model in at least FIGS. 2A, 2B, 2C, 2D, 2E, 2F, 4A, and 4B, indicating a likelihood that the guest would be interested in the particular products linked to the content pool stories. A higher score may indicate a higher likelihood or similarity between the guest's behavior in the retail environment and a particular product linked to a particular content pool story. Sometimes, the model output can include a particular story having a most relevant product to the guest's behavior in the retail envi-ronment. That outputted story can then be served, by the server system, to a computing device of the guest. In some implementations, the model output can include an intent mapping, described further below.

The server system can generate an intent mapping for the guest based on the prediction of products of interest to the guest (block 514). The intent mapping can indicate what types of products the guest may be looking for and/or is most interested in. The intent mapping can be based on content that the guest has clicked on and/or interacted with in the past. The mapping can be made in n-dimensional space, similarly as described above in reference to the product mapping in at least FIGS. 2D and 2E. The mapping can indicate correlations between the guest's behavior in the retail environment and products that are linked to the content pool stories. The mapping can be used by the server system to identify which products are most similar to the behaviors of the guest, and thus most likely to be of interest to the guest. In some implementations, the click-through model can be trained to generate the intent mapping then provide the mapping as output.

The server system may then determine, based on the prediction of the products of interest and/or the intent mapping, at least one story linking to a product of most interest to the guest (block 516). As described in reference to the blocks 420 and 424 in the process 400 of FIGS. 4A and 4B, the server system may use the intent mapping for the guest to determine similarity scores of products in the stories that may be most relevant to the guest's interests. The server system can rank the stories based on their similarity scores for the guest to determine the top/highest ranked story having at least one product of likely most interest to the guest.

In block 518, the server system can return the at least one story. Refer to the block 426 in the process 400 of FIGS. 4A and 4B for further discussion.

FIG. 5B illustrates techniques for determining a story to present for a group of guests using the click-through mod-eling techniques of FIG. 5A.

A sparse matrix 550 can be used to train the click-through model. The matrix 550 can include categorical features to represent one or more categorical variables. In some train-ing, for example, a feature dimension can be reduced from approximately 20,000 features to 4 features (or any other predetermined quantity of features). To reduce the feature dimension, one or more response variables can be aggre-gated to a date, story, and/or placement level. A binary click or no-click value can be determined, such as a sum of clicks and/or non-clicks. As a result, a row count may be reduced from approximately 109 million rows to 550,000 rows or fewer. A total dimension reduction can be performed. An original matrix for the model can be approximately 109 million×20,000 features. The reduced matrix for the model can be approximately 550,000×4 features. The reduced matrix may have any other configuration, as determined by relevant users and/or data inputs to the model.

A formula 552 can be used to determine a story to present to a group of guests. The formula 552 can be implemented by a crowd-based click model. The crowd-based click model can be implemented when an insufficient amount of infor-mation is known about a particular guest. For example, affinity categories may not be determined for the particular guest because the particular guest does not have an account or does not log into the online retail environment when interacting with it. The guest may additionally or alterna-tively be a new user of the online retail environment and/or may infrequently visit and interact with the online retail environment. As a result, the server system described herein may not be able to determine guest affinity categories to be used to identify particular stories to present for the particular guest. When the server system cannot determine stories for the particular guest, the system may apply the crowd-based click model to determine products that may be of most interest to a population of guests (e.g., an average guest of the retail environment). The crowd-based click model can implement the formula 552, as indicated above, to determine what content to present to a guest in a general population of guests.

In some implementations, the model can be a glmnet package in R language. The sparse matrix can be taken as input features. The response variable can be a binary vector or a two-column matrix of counts. A generalized linear model (GLM) may additionally or alternatively be used with elastic net penalty to generate model output.

FIGS. 6A and 6B are a flowchart of a process 600 for generating a page from a page template using predefined stories in that are selected for a particular guest using the disclosed techniques. The process 600 can be performed by the content server system 102 described herein. The process 600 may also be performed by one or more other computing systems, computing devices, network of systems/devices, and/or cloud-based systems. For illustrative purposes, the process 600 is described from the perspective of a server system.

Referring to the process 600 in FIGS. 6A and 6B, the server system can receive a request to create a page for an online platform, such as an online shopping experience or online shopping/retail environment (block 602). A user can start or resume building the page in an enterprise platform. In response to receiving the request, the server system can identify a page template that has been generated for use in creating pages for the online platform.

In block 604, the server system can serve a page template with predefined slots for receiving content and/or other attributes for presentation in the page. In some implementations, the page template can be generated and dynamically modified based on a type of page. For example, a Deals page can have different predefined slots and template than an Item Category page.

The server system can optionally receive input indicating (i) a desired channel for presenting the page and/or (ii) a classification for the page (block 606). Sometimes, this input can be received before serving the page template in block 604. The desired channel can include, but is not limited to, mobile application, mobile web, desktop web, and/or tablet. One or more channels having different presented requirements/standards are also possible. Input indicating the desired channel can be used by the server system to appropriately and dynamically adapt any information provided in the page template for presentation in that desired channel. Using the disclosed technology, any stories generated using the disclosed technology can be easily and readily adapted by the server system for presentation in any channel, regardless of what information is presented in the story and how the information is presented.

For example, the user can indicate that the page will be used in a mobile application. The user can select a story having an image with 4 products on sale to be presented in a particular slot of the page template. When serving that mobile application page, the server system can adjust a size or ratio of the user-selected image so that the image can be appropriately presented according to mobile application presentation standards/requirements (e.g., the image may be presented in a square arrangement since a mobile device has a narrow screen while the image may be presented in a stretched landscape arrangement for a desktop, which has a longer screen).

The input indicating the classification for the page can be used by the server system to dynamically generate and/or retrieve stories from the content pool that can be applied to one or more slots in the page that is being created. For example, the user can provide input indicating that the page is a product page for a pair of high heel shoes. This information can then be used by the server system to identify stories that may relate to high heel shoes, similar products, and/or deals, promotions, or offers for the high heel shoes or other similar shoes (these identified stories can be bucketized into a mini content pool and provided to the user at their device for selection and/or modification).

The server system can receive input indicating selection of a slot amongst the predefined slots in the page template (block 608).

In bock 610, the server system can determine whether the selected slot has at least one corresponding subset of stories from the content pool. The server system can determine whether one or more stories have been identified in association with information identifying the particular slot (e.g., if the slot is a DEALS slot, the server system can determine whether stories in the content pool are also identified for a DEALS slot). As another example, the server system can determine, based at least on a classification for the page, whether any stories are currently available and are relevant for the page and/or the particular slot. The server system can additionally or alternatively perform one or more personalization techniques to determine whether any currently-available stories satisfy interests of a particular user or otherwise are relevant to the user's behavior in a related online retail environment. The server system can compare and identify similar attributes between stories and the page being developed.

If the selected slot does not have at least one corresponding set of stories (e.g., the slot is not associated with any story, no story has been generated that shares attributes with attributes of the slot, the slot has not been defined to receive and present stories), then the server system can receive input indicating one or more content and/or attributes to presented in the selected slot (block 612). The user can provide input to customize how and what information is presented in the selected slot.

The server system can then serve the page according to the page template with the inputted content/attributes presented in the selected slot and based on the input indicating the desired channel for the page (block 614). The server system can serve the page to the user's computing device. Sometimes, the server system can serve the page to one or more end users (e.g., guests) who are accessing the particular page in the mobile application or any other channel. In some implementations, even if the user developed the page for the mobile application, end users can access the page from a desktop and/or tablet, which can cause the server system to dynamically adapt the page for presentation at the desktop and/or tablet and then serve the dynamically adapted page to the end users. The disclosed technology beneficially provides for dynamically adapting content that may be generated/created once for presentation across different channels.

If the selected slot has at least one corresponding subset of stories in block 610, the server system can access the content pool having the subset of predefined stories (block 616). The server system can return the subset in block 618.

In block 620, the server system can receive information indicating one or more modifications to attributes, guest personalization filter criteria, and/or story performance.

The server system may refine the subset of predefined stories based on the received information (block 622). For example, the server system can set/adjust filters and/or attributes to hone in on which stories to select and show in the slot for a particular guest. The server system may receive, in block 620, story performance information, which further may be used by the server system in block 622 to determine which of the stories to keep or remove from the subset (e.g., keep high-performing stories and remove low-performing stories). Sometimes, the server system may receive a product mapping for a particular guest in block 620 (as described at least in reference to FIGS. 2D, 2E, 4A, and 4B), which may be used by the server system to remove stories from the subset that are not as similar to the guest's interests as other products, which may be indicated in the product mapping. Accordingly, the received information can be used by the server system to further refine and personalize what story or stories are presented to a particular guest in the online retail environment.

The server system can then serve the page according to the page template with a computer-selected story from the set of predefined stories to be presented in the selected slot and based on the input indicating the desired channel for the page (block 624). The page can be served to the computing device of a particular guest for whom the server system selected the story from amongst the set of predefined stories.

Figure 7:
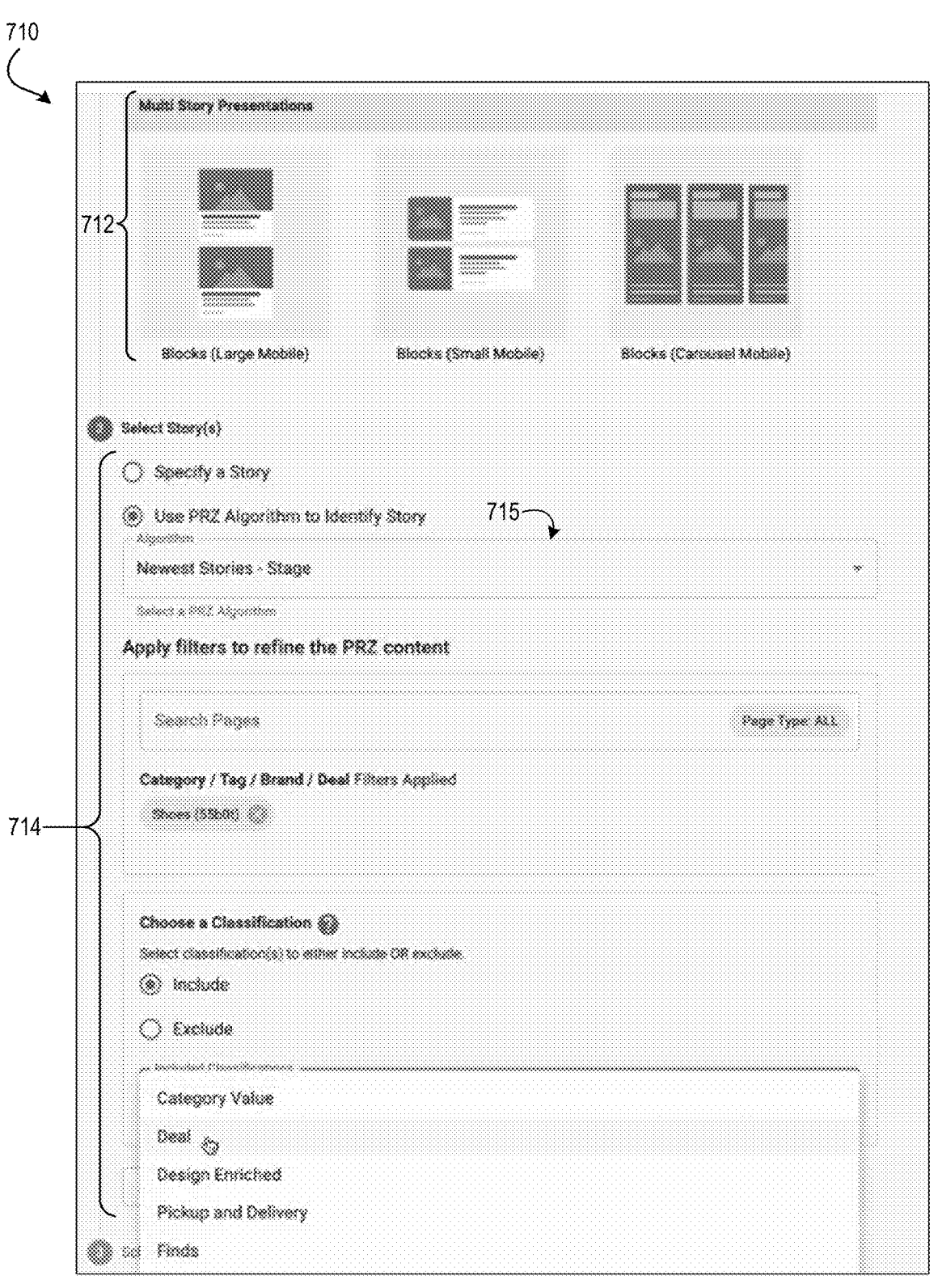
FIG. 7 illustrates an example template for a user to manually generate content for presentation in a page for an online retail environment or other type of online platform.

FIG. 7 illustrates an example template 710 for a user to manually generate content for presentation in a page for an online retail environment or other type of online platform. The template 710 allows a user, such as a content creator of the online retail environment, to manually enter information they desire to present in a particular slot in the page. Using the template 710, the user can provide inputs to define how the particular slot can be presented, how information can be selected for presentation in the particular slot, and/or what information may be presented in that slot. Using the template 710, the user may also determine and control what information, such as personalized content and stories, should be presented.

The template 710 can include selectable multi-story presentation options 712. The template 710 can also include selectable story options 714. Using the options 714, the user can select a personalization algorithm 715 that can be executed by the content server system 102 to identify a story to present in the particular slot for a particular guest. The user can select, as the personalization algorithm 715, the GSS model, the seasonality model, and/or the newest story model described in the process 400 of FIGS. 4A and 4B. Thus, the server system 102 may automatically implement the user-selected personalization algorithm 715 when selecting what story to present in a particular slot in a particular page for a particular guest requesting the particular page at their computing device.

Additionally or alternatively, using the options 714, the user can provide input indicating a specific story to present in the particular slot. Using the options 714, the user can provide input indicating one or more filters for refining content presented in the particular slot, such as personalized content for a particular guest. The filters can include taxonomy, such as a category, tag(s), brand(s), and/or deal(s). In some implementations, using the options 714, the user can provide input indicating one or more included or excluded classifications for information that can be presented in the particular slot. Any user inputs provided in the template 710 can be saved, stored in a data store described herein, and/or used by the server system 102 when serving the page upon request from guest computing devices. For example, the user selections made in the template 710 can be used by the server system 102 to further refine what stories are presented to different guests using the personalization algorithm techniques described herein.

Figure 8:
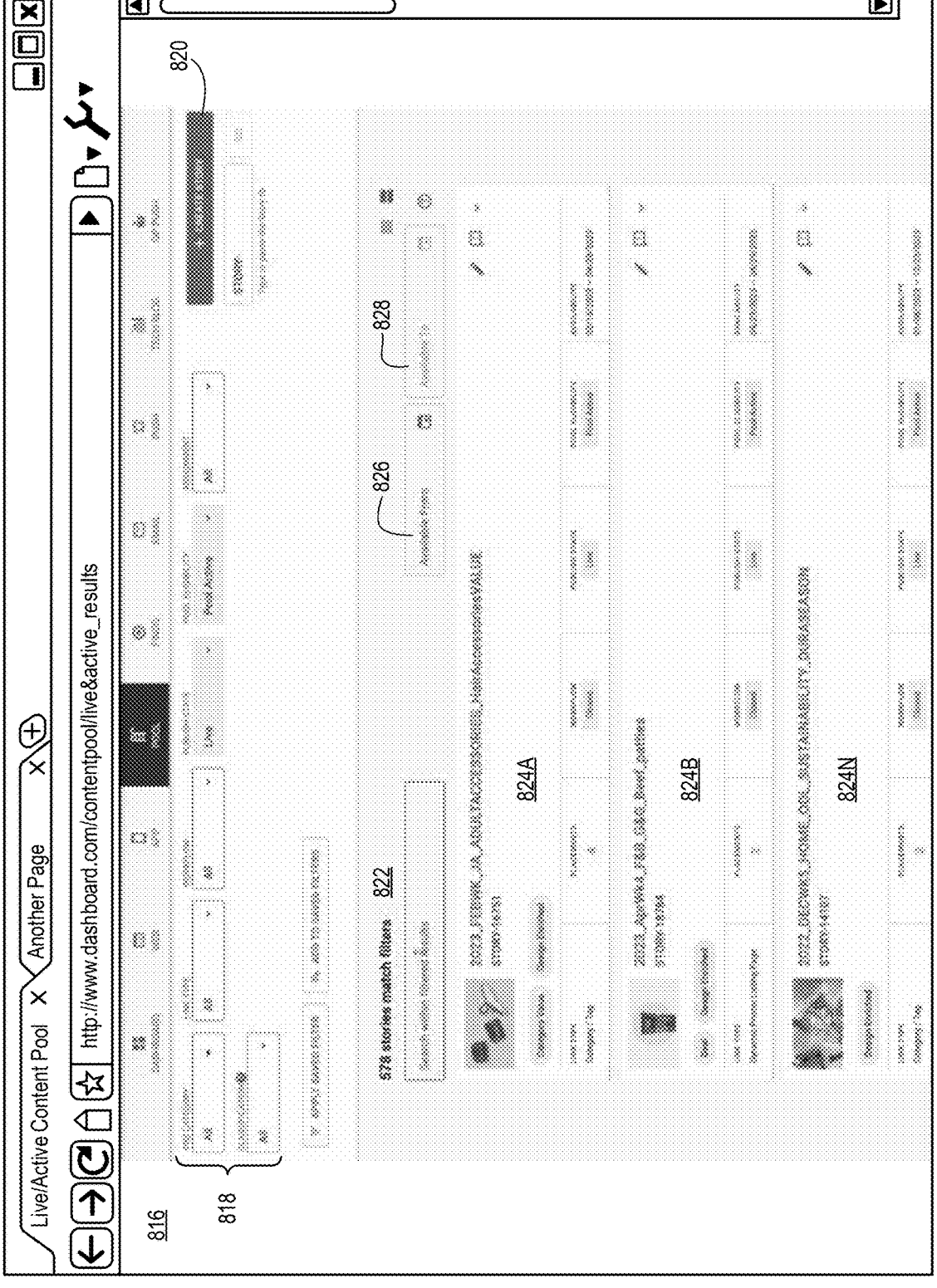
FIG. 8 illustrates an example graphical user interface (GUI) for viewing and filtering predefined stories in a content pool.

FIG. 8 illustrates an example graphical user interface (GUI) 816 for viewing and filtering predefined stories

824A-N in a content pool 822. The GUI 816 can be used to identify what content has been generated and/or is available for use. The GUI 816 can present filtering criteria 818 (e.g., classification, categorization) to narrow down what stories 824A-N (e.g., content) are presented in the GUI 816. The filtering criteria 818 can include options for a personalization category, link type, workflow, classification, publish state, pool eligibility, and/or assignment.

A relevant user can provide input indicating parameters for the filtering criteria 818 to hone in on which stories 824A-N are presented in the GUI 816. The server system 102 described herein can receive the user input for the filtering criteria 818 and use the input to automatically and dynamically curate the content pool 822 with the stories 824A-N that satisfy the filtering criteria 818. The user can then select any of the stories 824A-N to edit, modify, and/or use the selected story in content and/or page creation. The GUI 816 can also present a selectable option (e.g., button) 820, which allows the user to create a new story. The new story can be created for the content pool 822. Upon selecting the button 820, the use may be presented the template 710 of FIG. 7.

Referring to the filtering criteria 818, the personalization category indicates personalization information that may be used to associate stories with particular slots, pages, etc., The classification can indicate different types of classifications for a story, which can be derived from metadata associated with each story. Similarly, categorization can indicate different categorizations for the stories. The link type can be used to infer classification, and also to filter resulting stories based on whether the link type is for group offers, dynamic listing pages, etc. Workflow can be used to filter the stories based on status of processing/completion of story generation. The publish state can be used to filter the stories based on whether they are pending publication, live, etc. Eligibility similarly can be used to filter the stories based on whether the stories are active (e.g., in a pool, not assigned to a pool). Assignment can be used to filter the stories based on what users the stories are assigned to/associated with.

The GUI 800 can also present input fields 826 and 828, indicating an available from date and an available to date, respectively. The input fields 826 and 828 can be used by the relevant user to define a period of time during which the stories 824A-N must be active and alive for use. After all, although all the predefined stories 824A-N may initially be presented in the GUI 800, not all may actually be available for use when the relevant user desires to present stories to relevant guests.

Figure 9:
FIG. 9 illustrates example click-through rates resulting from identifying and presenting stories to guests using the disclosed guest story similarity techniques.

FIG. 9 illustrates example click-through rates in a graph 900 resulting from identifying and presenting stories to guests using the disclosed guest story similarity techniques. By personalizing what content is selected and served to each particular guest in an online retail environment using the personalization techniques described herein (e.g., the GSS model, the seasonality model, the newest story model, the click-through model), the online retail environment can experience improved or otherwise increased clicks and interactions with pages providing products and other services. In other words, click-through rate can increase when personalization techniques described herein are used.

In the example graph 900, a click-through-rate (CTR) was measured for top deal content 902, grocery L1 content 904, and clothing, shoes & accessories content 906. The top deal content 902 experienced approximately a 36% increase in CTR when going from static content serving 910 to personalization content serving 908. In some implementations, static content serving can indicate that various guests were served the same content, regardless of their unique preferences, projected sales for products in the content, and/or newness of the content. Personalization content serving, on the other hand, can indicate that each guest is served content that is unique to their preferences, projected sales for products in the content, and/or newness of the content, as described throughout this disclosure. The grocery L1 content 904 experienced approximately a 61% increase in CTR when going from static content serving 914 to personalization content serving 912. The clothing, shoes & accessories content 906 experienced approximately a 5% increase in CTR when going from static content serving 918 to personalization content serving 916. Because guests were being served content (e.g., stories) that was related to their interests, prior purchase habits/behaviors (as shown by the personalization content serving 908, 912, and 916), the guests were more likely to click on products in the served content. The increase clicks can lead to increased purchases and an overall improved shopping experience for the guests.

Figure 10:
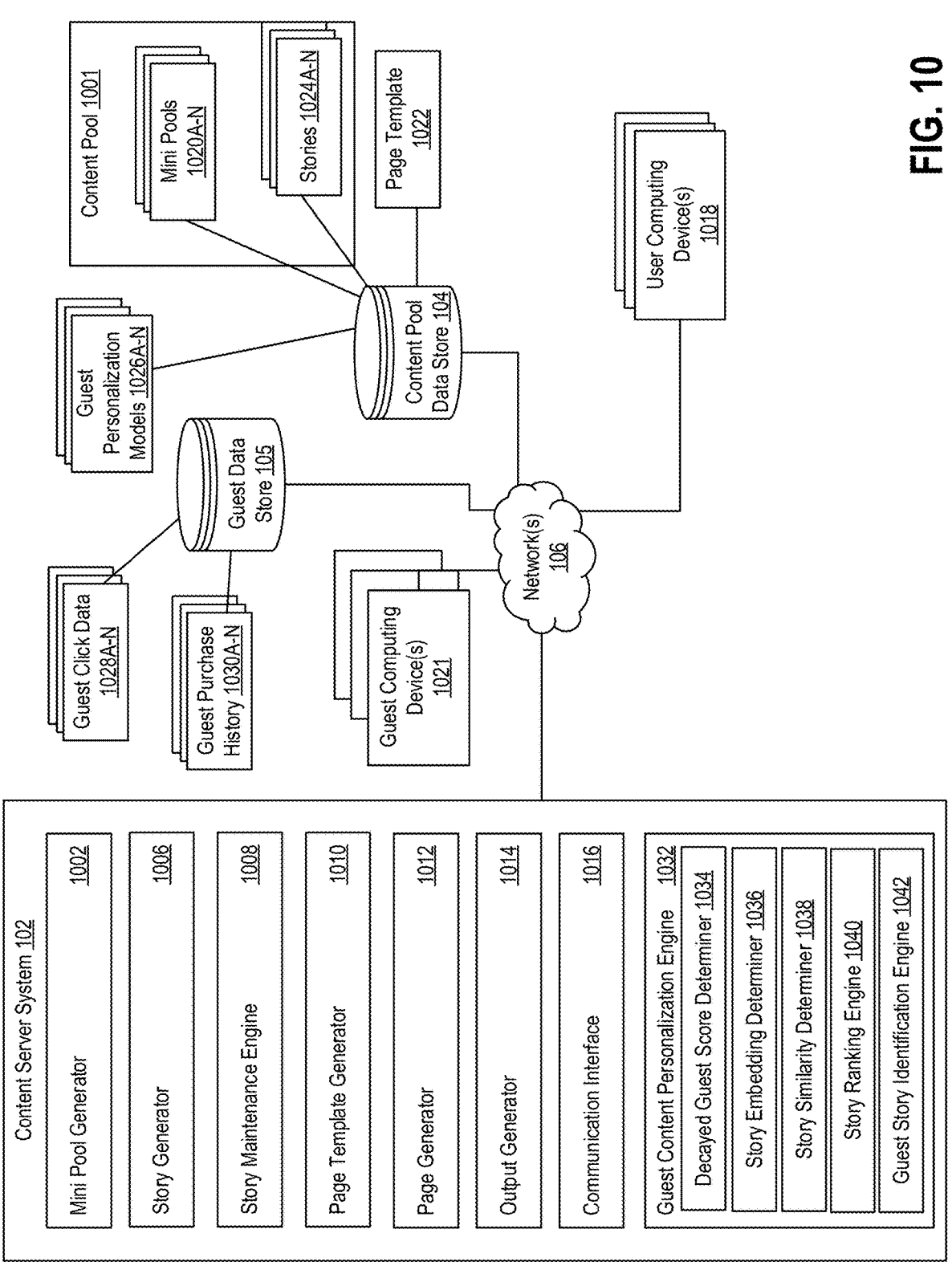
FIG. 10 is a system diagram of components that can be used to perform the disclosed techniques.

FIG. 10 is a system diagram of components that can be used to perform the disclosed techniques. The content server system 102, content pool data store 104, guest data store 105, user computing device(s) 1018, and guest computing device(s) 1021 can communicate (e.g., wired, wirelessly) via the network(s) 106. The server system 102 can be any type of web server or other computing system described throughout this disclosure.

The content server system 102 can include a mini pool generator 1002, a story generator 1006, a story maintenance engine 1008, a page template generator 1010, a page generator 1012, an output generator 1014, a communication interface 1016, and a guest content personalization engine 1032. The communication interface 1016 can be configured to provide communication between components of the server system 102 and the other system components described in FIG. 10. In some implementations, one or more components of the server system 102 may be part of another or a different computer system, content management system, and/or network of computing systems.

The mini pool generator 1002 can be configured to dynamically generate mini pools 1020A-N in a content pool 1001. These mini pools can be dynamically generated in response to receiving a query for relevant stories for a particular page that is being developed at the user computing devices 1018. In some implementations, the mini pools can be generated, stored in the content pool data store 104 as the mini pools 1020A-N, and then dynamically modified over time. Sometimes, the mini pool generator 1002 can also be configured to maintain the singular content pool 1001.

The story generator 1006 can be configured to generate one or more of the stories 1024A-N and store them in the data store 104 in association with the content pool 1001. The generator 1006 can receive user input from the user computing devices 1018 indicating one or more attributes and/or content to be presented in the story when the story is selected for presentation in one or more pages of an online platform.

The story maintenance engine 1008 can be configured to update one or more of the stories 1024A-N and store them in the data store 104. The engine 1008 can receive user input indicating one or more modifications to story attributes or other content. The modifications can be applied to the particular story and then stored in the data store 104 to ensure that the modified story is made available for future use by any other relevant users in designing their pages for the online platform or other online platforms. In some implementations, the engine 1008 can be part of or the same as the story generator 1006.

The page template generator 1010 can be configured to generate, update, and/or maintain a page template 1022. The page template 1022 can be stored in the data store 104 and accessed/retrieved by the page generator 1012 in response to a user at the user computing devices 1018 request for the page template 1022. The page template 1022 can be automatically and/or dynamically updated and/or modified overtime. The page template 1022 can be generated with predefined slots. The user at the computing device 1018 can provide input indicating what content and/or information to present in one or more of the predefined slots.

The page generator 1012 can be configured to generate a particular page for the online platform based on user input from the user computing devices 1018. The generator 1012 may also serve the page to the user computing device 1018 while the page is being dynamically generated so that the relevant user can review, modify, and create in real-time. The page generator 1012 can be configured to retrieve, access, or otherwise serve the relevant, timely, and/or available stories 1024A-N to the user computing device 1018 for selection and inclusion in one or more of the predefined slots in the page template 1022 for the particular page.

The output generator 1014 can be configured to generate any of the GUIs described throughout this disclosure. The output generator 1014 can serve or otherwise transmit the generated GUIs to the user computing devices 1018. In some implementations, the output generator 1014 can be configured to generate GUIs to be presented at the guest computing device(s) 1021, such as when the computing device 1021 transmits a request to view a page in the online retail environment.

The guest content personalization engine 1032 can be configured to perform the techniques described herein, including but not limited to identifying products of interest to particular guests in the retail environment, generating product and/or intent mappings for each of the guests in the retail environment, ranking stories for each guest based on their respective product and/or intent mappings, and/or selecting stories to present to each guest based on their respective rankings. The engine 1032 can retrieve one or more guest personalization models 1026A-N from the content pool data store 104 (or the guest data store 105), which can be used to perform the abovementioned techniques. The guest personalization models 1026A-N may include any of the GSS model, the seasonality model, the newest story model, and/or the click-through model described herein (refer to at least FIGS. 2A, 2B, 2C, 2D, 2E, 2F, 4A, and 4B). The engine 1032 can also retrieve data from the guest data store 105 that can be used to perform the disclosed techniques. For example, the engine 1032 can retrieve guest purchase history data 1030A-N and/or guest click data 1028A-N. The retrieved data can be provided as input to the retrieved model(s), which can be trained to generate output as described herein. The engine 1032 can include one or more subcomponents for performing the abovementioned techniques, such as a decayed guest score determiner 1034, a story embedding determiner 1036, a story similarity determiner 1038, a story ranking engine 1040, and a guest story identification engine 1042.

The decayed guest score determiner 1034 can be configured to determine relevancy and/or guest interest in products that have been purchased by the guest over some predetermined period of time. The determiner 1034 can perform the techniques described in reference to at least FIG. 2C.

The story embedding determiner 1036 can be configured to determine what products are linked to the stories 1024A-N in the content pool 1001. The determiner 1036 may also map the stories 1024A-N into n-dimensional space based on the product embeddings of the stories 1024A-N. Refer to at least FIG. 2D for further discussion.

The story similarity determiner 1038 can be configured to determine similarity scores/values between the product embeddings of the stories 1024A-N and similar products that may be of interest to the particular guest. The determiner 1038 may also be configured to determine a final guest story similarity score for each of the stories 1024A-N based on determinations made by the decayed guest score determiner 1034 and the story embedding determiner 1036. Refer to at least FIGS. 2E and 2F for further discussion about determining the story similarities.

The story ranking engine 1040 can be configured to rank the stories 1024A-N based on their respective similarity scores/values. The engine 1040 can rank the stories 1024A-N from highest to lowest similarity. The engine 1040 can, in some implementations, rank the stories 1024A-N based on their respective similarity scores, then filter the ranked stories based on one or more guest personalization filter criteria. Refer to at least FIG. 2F for further discussion about ranking the stories 1024A-N.

The guest story identification engine 1042 can be configured to select a highest ranked story from the ranked stories 1024A-N, then serve the selected story to the respective guest computing device 1021. Where multiple stories 1024A-N have the same highest ranked score, the engine 1042 can perform randomization techniques to select one of those stories at random.

Sometimes, the determiners 1034, 1036, and 1038 can be configured to perform respective operations in batch processes at predetermined times. For example, the operations of the determiners 1034, 1036, and 1038 can be performed every night or at another time when compute resources are available to perform such processing techniques. During runtime, the engines 1040 and/or 1042 may perform their respective operations. As a result of offloading heavier-processing operations to times for batch processing, ranking, filtering, and/or story selection operations can be performed quickly, accurately, and efficiently in real-time. Therefore, guests at their respective computing devices 1021 may be served stories relevant to their personal tastes/interests during runtime, while they are navigating through the online retail environment, and without experiencing lag from the server system 102 having to perform other operations, such as determining what products each guest may be interested in.

Still referring to FIG. 10, the user computing devices 1018 can be any type of user device, computing device, mobile device, smartphone, mobile phone, laptop, tablet, and/or computer that can be used by content creators, designers, and/or others in an enterprise. The users of the user computing devices 1018 can create and/or modify content (e.g., the stories 1024A-N) to be presented in a platform for the online retail environment provided by the enterprise. The GUIs described throughout this disclosure can be presented/displayed/outputted at the user computing devices 1018. The relevant users can provide user input (e.g., using keyboards, mice, microphones, speakers, touch screens) at the user computing devices 1018, which can be transmitted to the server system 102 and used by one of the respective components to generate and/or modify the content, pages, etc.

The computing devices 1021 can be any type of user device, computing device, mobile device, smartphone, mobile phone, laptop, tablet, and/or computer that can be used by end users, such as guests, seeking to interact with the online retail environment. The computing devices 1021 can be devices that request pages of the online retail environment for presentation, display, and/or output. Each of the computing devices 1021 can have different presentation standards and/or requirements. In other words, each of the computing devices 1021 can provide a different channel, such as a mobile application, a mobile webpage, a desktop webpage, and/or a tablet webpage. When the computing devices 1021 request the pages, the server system 102 can dynamically modify the requested pages for presentation according to the channel associated with the computing device and then serve the modified pages.

Figure 11:
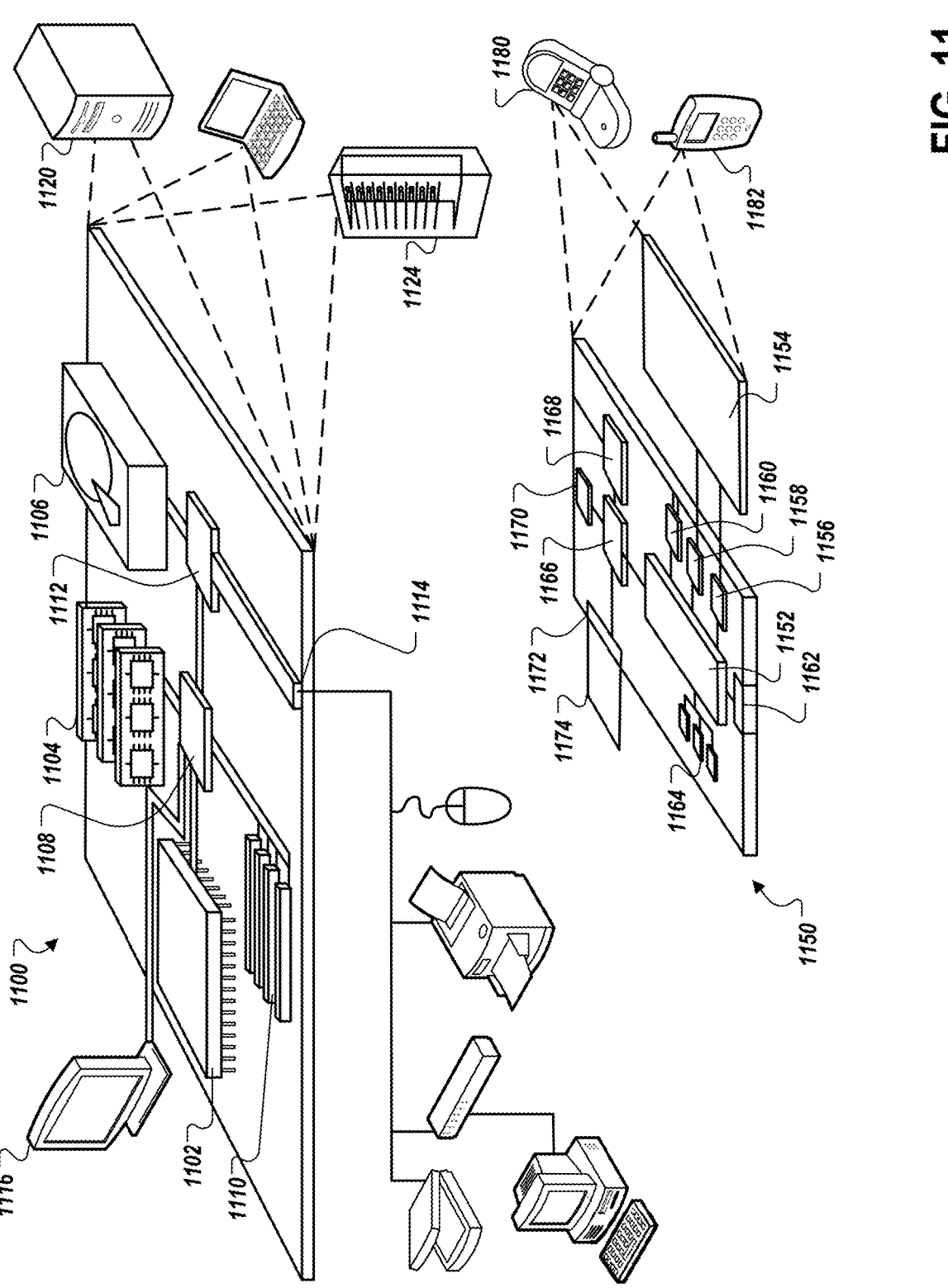
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for dynamically serving personalized digital content in real-time for presentation across computing devices of different guests in an online retail environment, the server system comprising:

a data repository configured to store (i) a plurality of predefined digital content stories in a content pool and (ii) guest behavior data of a plurality of guests in an online retail environment, wherein the predefined digital content stories comprise visual content elements that are configured to be maintained in a single instance and visually presented according to different presentation requirements of different channels; and a server system in data communication with the data repository, wherein the server system comprises one or more processors, cache memory, and memory storing instructions that, when executed, cause the one or more processors to perform operations comprising:

retrieving, at a first time and from the data repository, (i) a subset of the predefined digital content stories having a predetermined activation status and (ii) the guest purchase data for at least a portion of the plurality of guests in the online retail environment, wherein the guest purchase data indicates one or more products that each guest of the portion of guests has purchased;

determining, at the first time, product embeddings for each story in the subset of the predefined digital content stories, wherein each of the product embeddings indicates a product that is linked to the story;

determining, at the first time and based on applying a guest story similarity (GSS) model to the guest purchase data for each of the portion of guests, a similarity score between the guest purchase data and the determined product embeddings, wherein the similarity score indicates a likelihood that the guest would purchase one or more products that are embedded in the story;

storing in the cache memory, at the first time and for each of the portion of guests, a ranked list of the subset of the predefined digital content stories from highest to lowest similarity score, wherein storing in the cache memory reduces computational resources required for serving personalized digital content at a second time, wherein the second time is real-time;

receiving, at the second time, a request for digital content in the online retail environment from a computing device of a guest amongst the portion of guests, wherein the request indicates a channel associated with the computing device of the guest;

retrieving, at the second time and in response to receiving the request, the ranked list of digital content stories from the cache memory;

selecting, at the second time, a story amongst the ranked digital content stories having a similarity score that satisfies one or more guest personalization criteria; and serving, at the second time, the selected story to the computing device of the guest, wherein serving the selected story comprises dynamically generating, based on the single instance associated with the visual content elements of the story, new visual content elements of the story that comply with presentation requirements of the channel indicated in the request.

2. The system of claim 1, wherein determining, at the first time, product embeddings for each story in the subset of the predefined digital content stories comprises identifying the products that are linked to the story.

3. The system of claim 1, wherein determining, at the first time, product embeddings for each story in the subset of the predefined digital content stories comprises:

augmenting data associated with the story to derive one or more story attributes, wherein the story attributes include at least one of a category, a story brand map, a story facet map, and a story offer map.

4. The system of claim 3, wherein determining the product embeddings for each story in the subset is further based on mapping the derived story attributes into n-dimensional space.

5. The system of claim 1, wherein determining, at the first time and based on applying a guest story similarity (GSS) model to the guest purchase data for each of the portion of guests, a similarity score between the guest purchase data and the determined product embeddings comprises:

calculating an exponential decay of the guest purchase data; and determining a decayed guest product score based on the exponential decay.

6. The system of claim 5, wherein the decayed guest product score is based on frequency and recency that the guest purchased the one or more products in the online retail environment over a predetermined period of time.

7. The system of claim 6, wherein the server system is further configured to:

calculate, for each story in the subset of the predefined digital content stories, a cosine similarity between the product embeddings and the guest purchase data; and determine a story product similarity score.

8. The system of claim 7, wherein the server system is further configured to map the product embeddings and the one or more products in the guest purchase data into n-dimensional space.

9. The system of claim 8, wherein the server system is further configured to:

determine a distance between each of the product embeddings and each of the one or more products in the guest purchase data; and identify a product associated with one of the product embeddings that has a smallest distance to at least one of the products in the guest purchase data in the n-dimensional space mapping.

10. The system of claim 7, wherein the server system is further configured to:

determine a summation of the decayed guest product score multiplied by the story product similarity score; and return the summation as the similarity score between the guest purchase data and the determined product embeddings.

11. The system of claim 1, wherein selecting the story amongst the ranked digital content stories comprises filtering the ranked digital content stories based on information included in the request from the computing device of the guest, wherein the information indicates at least one of: (i) a type of digital content requested for presentation in a graphical user interface (GUI) display at the computing device of the guest and (ii) a channel for presentation of the selected story.

12. The system of claim 11, wherein the type of digital content includes at least one of a deal, an offer, and a category of products available for purchase in the online retail environment.

13. The system of claim 11, wherein the server system is further configured to, based on the channel for presentation of the selected story, dynamically adjust the presentation of the singular instance of the content elements of the selected story based on presentation requirements of the channel, wherein the singular instance of the content elements is commonly used across all channels.

14. The system of claim 1, wherein the server system is further configured to:

determine whether at least threshold information is known about the guest in the portion of guests; and based on determining that at least the threshold information is known, applying the GSS model to determine the similarity score for the guest.

15. The system of claim 14, wherein the server system is further configured to, in response to determining that at least the threshold information is unknown about the guest, apply at least one of seasonality model and a newest story model to the subset of the predefined digital content stories to determine a story to serve to the guest.

16. The system of claim 15, wherein the seasonality model is configured to:

predict aggregated seasonal forecasted sales over a predetermined period of time for each of the subset of the predefined digital content stories; and rank the subset of the predefined digital content stories by their predicted sales from highest to lowest predicted sales.

17. The system of claim 16, wherein the server system is further configured to:

select a top ranked story amongst the subset of the predefined digital content stories that are ranked by the predicted sales; and serve the selected story to the computing device of the guest.

18. The system of claim 15, wherein the newest story model is configured to rank the subset of the predefined digital content stories based on respective activation date, from latest to earliest activation date, wherein the respective activation date is identified in metadata associated with each story in the subset of the predefined digital content stories, and wherein the server system is configured to:

select a top ranked story amongst the subset of the predefined digital content stories that are ranked from latest to earliest activation date; and serve the selected story to the computing device of the guest.

19. The system of claim 1, wherein the server system is further configured to:

retrieve a click-through model;

provide output from the GSS model and the guest purchase data for each guest in the portion of guests as input to the click-through model;

receive, as output from the click-through model, a prediction of products of interest to the guest based on assessment of guest engagement with products in the online retail environment identified in the input data;

identify, based on the prediction, at least one story of the subset of predefined digital content stories that links to a product of most interest to the guest; and serve the at least one story to the computing device of the guest.

20. The system of claim 19, wherein the click-through model is trained to generate an intent mapping for the guest based on the prediction, wherein the intent mapping indicates numerical correlations between the guest engagement in the online retail environment and products available for purchase in the online retail environment.

\* \* \* \* \*